(12) United States Patent
Bankston et al.

(10) Patent No.: US 11,843,951 B2
(45) Date of Patent: Dec. 12, 2023

(54) SYSTEMS AND METHODS FOR PROVIDING AND USING WEARABLE ELECTRONIC ACCESSORIES

(71) Applicant: Audeo LLC, Winter Park, FL (US)

(72) Inventors: Carolyn Ann Bankston, Winter Park, FL (US); Jordan Gardinal, New Port Richey, FL (US)

(73) Assignee: AUDEO LLC, Winter Park, FL (US)

( * ) Notice: Subject to any disclaimer, the term of this patent is extended or adjusted under 35 U.S.C. 154(b) by 0 days.

(21) Appl. No.: 17/983,998

(22) Filed: Nov. 9, 2022

(65) Prior Publication Data
US 2023/0142055 A1 May 11, 2023

Related U.S. Application Data

(60) Provisional application No. 63/277,417, filed on Nov. 9, 2021.

(51) Int. Cl.
| | | |
|---|---|---|
| *G06F 7/04* | (2006.01) | |
| *G06F 15/16* | (2006.01) | |
| *H04L 29/06* | (2006.01) | |
| *H04W 12/50* | (2021.01) | |
| *H04W 12/33* | (2021.01) | |
| *H04W 12/06* | (2021.01) | |
| *H04L 67/1095* | (2022.01) | |

(52) U.S. Cl.
CPC ........... *H04W 12/50* (2021.01); *H04W 12/06* (2013.01); *H04W 12/33* (2021.01); *H04L 67/1095* (2013.01)

(58) Field of Classification Search
CPC ..... H04W 12/50; H04W 12/06; H04W 12/33; G06F 1/163
USPC ............................................................ 726/6
See application file for complete search history.

(56) References Cited

U.S. PATENT DOCUMENTS

| | | |
|---|---|---|
| 5,956,630 A | 9/1999 | Mackey |
| 7,782,191 B2 | 8/2010 | Flores |
| 8,747,336 B2 | 6/2014 | Tran |
| 8,964,298 B2 | 2/2015 | Haddick et al. |
| 9,824,310 B2 | 11/2017 | Huynh |
| 9,898,039 B2 | 2/2018 | Moore et al. |
| 10,248,856 B2 | 4/2019 | Moore et al. |

(Continued)

FOREIGN PATENT DOCUMENTS

WO 2020125839 6/2020

*Primary Examiner* — Jeffrey C Pwu
*Assistant Examiner* — Samuel Ambaye
(74) *Attorney, Agent, or Firm* — Bryan Cave Leighton Paisner LLP

(57) ABSTRACT

This disclosure relates to improved systems and methods for providing and using wearable electronic accessories. A wearable electronic necklace accessory can include a support structure that permits the wearable electronic accessory to be worn in a user's neck region. The wearable electronic necklace accessory can include an electronic pendant coupled to the support structure, the electronic pendant can comprise a housing that includes a first wall, a second wall, and one or more side walls configured to couple the first wall to the second wall. The wearable electronic necklace accessory can include a display device and an audio device positioned within the pendant housing and configured to output electronic media and audio content. Other embodiments are disclosed.

17 Claims, 24 Drawing Sheets

(56) References Cited

U.S. PATENT DOCUMENTS

| | | |
|---|---|---|
| 10,420,379 B2 | 9/2019 | Pond |
| 2005/0052852 A1 | 3/2005 | Ono |
| 2005/0168576 A1 | 8/2005 | Tanahashi |
| 2007/0276740 A1 | 11/2007 | Hunter et al. |
| 2010/0245078 A1 | 9/2010 | Nadkarni et al. |
| 2014/0267940 A1 | 9/2014 | Ackerman |
| 2015/0199566 A1* | 7/2015 | Moore ................. G01C 21/206 348/47 |
| 2016/0350060 A1 | 12/2016 | Park et al. |
| 2016/0373870 A1* | 12/2016 | Kang ................... H04R 1/1025 |
| 2017/0318137 A1* | 11/2017 | Holden ............. H04M 1/72409 |

* cited by examiner

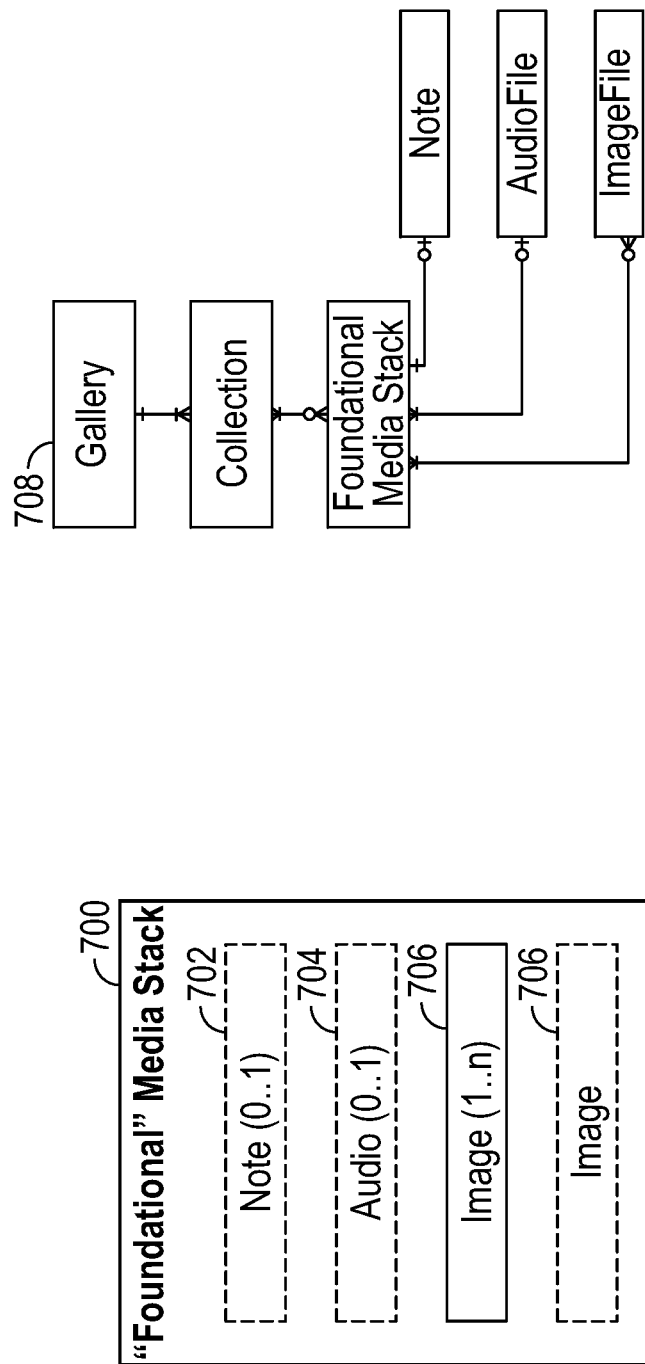

SYSTEMS AND METHODS FOR PROVIDING AND USING WEARABLE ELECTRONIC ACCESSORIES

CROSS-REFERENCE TO RELATED APPLICATIONS

This application claims benefit of, and priority to, U.S. Provisional Application No. 63/277,417 filed on Nov. 9, 2021, which is herein incorporated by reference in its entirety.

TECHNICAL FIELD

This disclosure is related to wearable electronic accessories, as well as corresponding systems, devices, computer program products, and methods associated with the wearable electronic accessories. In certain embodiments, the wearable electronic accessories correspond to jewelry accessories (e.g., necklaces) that can be customized to display or output various types of electronic media (e.g., audio, video, etc.) based on commands received from mobile applications and/or other types of applications.

BRIEF DESCRIPTION OF DRAWINGS

To facilitate further description of the embodiments, the following drawings are provided, in which like references are intended to refer to like or corresponding parts, and in which:

FIG. 7A illustrates an exemplary media stack according to certain embodiments;

FIG. 7B illustrates an exemplary data structure for the media stack of FIG. 7A according to certain embodiments;

Figure 1:
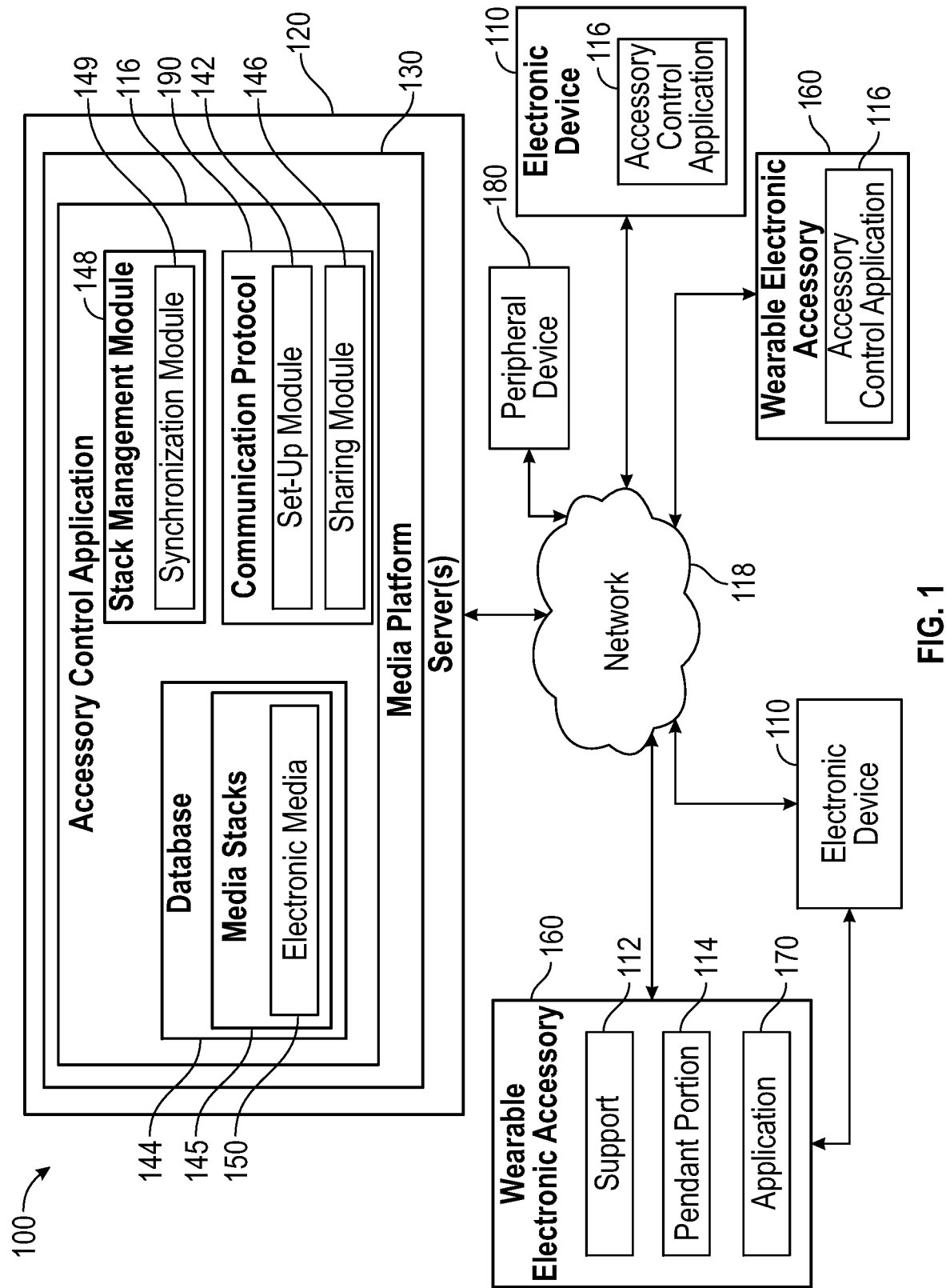
FIG. 1 is a block diagram of an exemplary system in accordance with certain embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Coupling may be for any length of time, e.g., permanent or semi-permanent or only for an instant. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXEMPLARY EMBODIMENTS

The present disclosure relates to systems, methods, apparatuses, and computer program products associated with providing and utilizing wearable electronic accessories. In certain embodiments, wearable electronic accessories are equipped with output devices that can display or output various types of electronic media (e.g., images, videos, audio, text, etc.). The wearable electronic accessories also can be equipped with communication devices that enable the wearable electronic accessories to communicate with electronic devices (e.g., mobile devices, smart phones, and/or other computing devices). The electronic devices can store and execute an accessory control application that transmits commands and data to the wearable electronic accessories to customize the electronic media that is output by the wearable electronic accessories, and to perform other related functions described herein. Amongst other things, the technologies described herein can be incorporated into electronic jewelry and/or other electronic accessories that include visual displays, audio devices, and/or other output devices.

The techniques described herein can be utilized to enhance any type of wearable electronic accessory. The configuration and components of the wearable electronic accessory can vary. In certain embodiments, the wearable electronic accessories can correspond to necklace accessories, each of which includes a support (e.g., a chain or cord for connecting the accessory to an individual's neck) and a pendant portion (e.g., a locket, ornament, and/or other structure connected to the neck support). The pendant portion can include a housing that integrates various electronics for performing the functionalities described herein (e.g., such as outputting electronic media, communicating with electronic devices, etc.). Amongst other things, the pendant portion can be communicatively coupled to an electronic device (e.g., a mobile electronic device or smart phone) that executes an accessory control application configured to send electronic media to the pendant portion and commands for controlling the functionality of the pendant portion. These technologies also can be adapted and applied to other types of wearable electronic accessories (e.g., electronic bracelets, electronic rings, etc.).

The configuration and components integrated into the pendant portion can vary. In certain embodiments, the pendant portion can comprise a housing that includes a first wall (e.g., which faces outwardly from a user when the wearable electronic accessory is worn), a second wall (e.g., which faces toward a user's body when the wearable electronic accessory is worn), and one or more side walls for connecting the first wall and the second wall. A display device (e.g., an LCD or LED display device) can be integrated into the first wall to enable electronic media to be displayed. Additionally, openings can be incorporated into the first wall, second wall, and/or one or more side walls to permit output of audio content. The first wall, second wall, and one or more side walls of the housing can form an enclosure that includes a spacing situated between the first and second walls.

Various electronic components can be situated within a spacing located between the first and second walls. Exemplary electronic components included within the spacing can include any or all of the following: one or more audio output devices, one or more audio amplifier devices, one or more communication devices (e.g., wireless communication devices), one or more display controllers, one or more processor devices, one or more storage devices, one or more printed circuit boards, one or more power control boards, one or more batteries, one or more input/output (I/O) control boards, one or more microphones, and/or one or more connectors for electrically coupling the electronic components. Because there may be very limited space within the housing enclosure, the electronic components can be arranged in a specially design layout which minimizes the size and profile of the electronic components.

In certain embodiments, the accessory control application executed by an electronic device can be configured to package a collection of electronic media into a media stack that is transmitted to the wearable electronic accessory. Each media stack can be used to store and organize a plurality of electronic media items (e.g., images, audio files, videos, etc.) in a specially designed format. The wearable electronic accessory can execute an application or code that unpacks the media stack, and causes the corresponding electronic media included in the media stack to be displayed or output in a specified display mode (e.g., in a static image display mode and/or rotating slideshow display mode). The utilization of media stacks allows for efficient transmission of electronic media between or among the electronic devices and/or wearable electronic accessories. Additionally, the media stacks can ensure the electronic media remains in a proper order and format for repeated playback.

In some embodiments, the wearable electronic accessories can be configured to communicate directly with each other (e.g., using NFC devices and/or other communication devices). For example, electronic media stored on a first pendant of a first user can be directly transmitted to a second pendant of a second user. The first pendant can pair and/or synchronize with the second pendant to transmit the electronic media to the second pendant. Such synchronization and communication among wearable electronic accessories allows for the ease of use and shareability of electronic media. Further, the utilization of media stacks facilitates the efficient transmission of electronic media between or among the wearable electronic accessories.

In some embodiments, the accessory control application can execute a synchronization procedure to enable media stacks and/or electronic media to be transmitted by electronic devices to the wearable electronic accessories. Amongst other things, this synchronization procedure can be used to pair the wearable electronic accessories to the electronic devices, compress electronic media to accommodate reduced resolutions of display devices included on the wearable electronic accessories, and verify that media stacks were successfully transferred to the wearable electronic accessories.

For example, in some scenarios, the accessory control application can initially be paired or synchronized with a plurality of wearable electronic accessories, and settings for communicating with each of the wearable electronic accessories can be stored by the accessory control application. When a user desires to transmit one or more media stacks to a wearable electronic accessory, the user can utilize the accessory control application to select desired media stacks and to designate the particular wearable electronic accessory that is to receive the one or more media stacks. The accessory control application can then compress the electronic media associated with each of the media stack stacks into a format that is optimized for output by the selected wearable electronic accessory (e.g., to a resolution that matches the display screen size of the wearable electronic accessory). After a connection is established between the designated wearable electronic device and the accessory control application, the accessory control application can verify that the connected wearable electronic device is the same device that was designated by the user, and transmit the one or more media stacks to the wearable electronic device. The wearable electronic device can send a response that enables the accessory control application to verify whether or not the selected media stacks were successfully transferred to the wearable electronic device.

The configuration and functionality provided by the accessory control application can vary. In some embodiments, the accessory control application can generate one or more graphical user interfaces (GUIs) for display on an electronic device (e.g., a mobile device or smart phone). The one or more GUIs can be configured to facilitate any or all of the following functions: receive electronic media; edit electronic media (e.g., append text to images or videos files, add audio to images or video files, compress electronic media files, etc.); create and edit media stacks using the electronic media; establish connections between one or more wearable electronics accessories and the mobile device; create galleries of media stacks to organize images, videos, and/or audio content; initialize or configure wearable electronics accessories; synchronize electronic media across two or more wearable electronics accessories; transmit media stacks and/or electronic media to wearable electronics accessories; and/or facilitate sharing of media stacks and electronic media. The accessory control application can be configured to perform other functions as well.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

FIG. 1 is a block diagram of an exemplary system 100 according to certain embodiments. The system 100 comprises one or more electronic devices 110, one or more servers 120, one or more wearable electronic accessories 160, and one or more peripheral devices 180 that are in communication over a network 118. A media platform 130 can be stored on, and executed by, the one or more servers 120. The one or more servers 120 and/or media platform 130 also can include and/or execute one or more accessory control applications 116. The system 100 can include any number (e.g., one or multiple) of electronic devices 110, servers 120, accessory control applications 116, wearable electronic accessories 160, peripheral devices 180, and media platforms 130.

Each of the electronic devices 110 can store and execute an accessory control application 116, and each can be in communication with one or more electronic devices 110 (e.g., mobile devices, desktop devices, etc.), one or more wearable electronic accessories 160 (e.g., pendant portions of the wearable electronic accessories 160) and one or more peripheral devices 180 (e.g., smart speakers, smart televisions, smart set-top-boxes, etc). As described in further detail below, the accessory control application 116 can be configured to perform various functions associated with preparing media stacks 145 and/or electronic media 150 for transmission to the wearable electronic accessories 160 and/or the peripheral devices 180, and controlling the functionalities of the wearable electronic accessories 160.

Each of the wearable electronic accessories 160 can store and execute an application 170 and can be in communication with one or more electronic devices 110, one or more peripheral devices 180, and/or one or more separate wearable electronic accessories 160. The application 170 can be configured, inter alia, to facilitate communication with the wearable electronic accessories 160, facilitate communication with electronic devices 110, facilitate communication with the peripheral devices 180 and output electronic media stacks 145 and/or electronic media 150 via output devices integrated into the wearable electronic accessories 160. In some embodiments, the application 170 also may permit a user to select a desired output mode. Exemplary output modes may include: a static display mode (e.g., which allows a single image or video to be continuously displayed) and a rotating display mode (e.g., which permits display of electronic media in a slideshow or rotating fashion). Any functionality described herein with respect to the accessory control application 116 stored on the electronic devices 110 can additionally, or alternatively, be executed by the application 170 stored on the wearable electronic accessories 160 and/or by an application (e.g., applications 116, 170) on the peripheral devices 180.

In certain embodiments, the accessory control applications 116 can include a set-up module 142, a database 144, a sharing module 146, a stack management module 148, and a communication protocol 190. The database 144 can include or store media stacks 145, each of which comprises one or more electronic media 150 (e.g., image files, video files, audio files, etc.). In some embodiments, the stack management module 148 can include a synchronization module 149. Each of these components is described in further detail below.

The network 118 may represent any type of communication network, e.g., such as one that comprises the Internet, a cellular network, a telecommunications network, a private intranet, a virtual private network (VPN), a local area network (e.g., a Wi-Fi® network), a personal area network (e.g., a Bluetooth® network), a wide area network, an intranet, a cellular network, a television network, and/or other types of networks.

All the components illustrated in FIG. 1, including the electronic devices 110, servers 120, accessory control applications 116, wearable electronic accessories 160, peripheral devices 180, and media platforms 130 can be configured to communicate directly with each other and/or over the network 118 via wired or wireless communication links, or a combination of the two. Each of these components (e.g., each of the electronic devices 110, servers 120, accessory control applications 116, and media platforms 130, wearable electronic accessories 160, peripheral devices 180, etc.) also can be equipped with one or more communication devices (e.g., transceiver devices and/or wire-based communication devices or interfaces), one or more computer storage devices, and one or more processing devices that are capable of executing computer program instructions. Each of these components also can include, or be connected to, one or more display devices (e.g., liquid crystal displays or LCDs, light emitting diode or LED displays, plasma displays, touchscreen displays, and/or other types of displays) and/or one or more input devices (e.g., scroll wheel (e.g., crown-type scroll wheel), keyboards, mouse devices, capacitive sensing devices, joysticks, gamepads, gaming controllers, track balls, microphones, touchpads, optical sensing devices, scanners, mechanical switches and buttons, camera devices, video devices, touch screen devices, etc.).

The one or more processing devices may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

The one or more computer storage devices (e.g., database 144) can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices can be physical, non-transitory mediums.

In certain embodiments, the electronic devices 110 may represent or include mobile electronic devices (e.g., smart phones, tablet devices, personal digital assistants, tablet devices, wearable devices, and/or any other device that is mobile in nature). Additionally, or alternatively, the electronic devices 110 can include desktop computers, laptop computers, gaming consoles (e.g., PlayStation®, Nintendo®, Xbox® and/or other gaming consoles) and/or other types of electronic devices. The one or more servers 120 may generally represent any type of computing device, including any of the electronic devices 110 mentioned in this disclosure. In certain embodiments, the one or more servers 120 comprise one or more mainframe computing devices that are configured to communicate with the electronic devices 110, wearable electronic accessories 160, peripheral devices 180, and/or accessory control applications 116 (and/or other applications and devices) over the network 118 (e.g., over the Internet and/or a cellular network in some scenarios). Additionally, one or more electronic devices 110, wearable electronic accessories 160, and/or peripheral devices 180 can execute an operating systems such as (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, (iv) Linux® OS, (v) the WebOS operating system by LG Electronics of Seoul, South Korea, (vi) the operating systems developed by Google, of Mountain View, California, United States of America, and/or (vii) the Symbian™ operating system by Accenture PLC of Dublin, Ireland. In some embodiments, the one or more electronic devices 110, wearable electronic accessories 160, and/or peripheral devices 180 can execute another type of operating software.

As mentioned above, some or all of the electronic devices 110 may represent mobile electronic devices. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, California, United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, (iv) an Amazon Alexa® or similar product offered by Amazon.com, Inc. of Seattle, Washington, United States of America, and/or (v) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android® operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

In certain embodiments, the wearable electronic accessories 160 may include a capacitive touch screen device (e.g., included on a pendant portion 114 and/or support 112 of the wearable electronic accessories 160) and/or other input devices. The input devices included on the wearable electronic accessories 160 can permit users to provide inputs or selections (e.g., gestures) to control various functionalities (e.g., such as selecting media stacks 145 for output and/or pairing with electronic devices 110). The electronic devices 110 also may include one or more input devices (e.g., touchscreens, keyboards, etc.) that permit users to control various functionalities of the accessory control applications 116.

In certain embodiments, the accessory control applications 116 executed by the electronic devices 110 can permit users to specify inputs or selections via the accessory control applications 116 to upload, create, and/or edit electronic media 150. The electronic media 150 can include any type of media file including, but not limited to, files including images, audio, video, and/or text.

The accessory control applications 116 executed by the electronic devices 110 also can permit users to create media stacks 145, each of which includes one or more electronic media files. Each media stack 145 can include a data structure or container that that serves to package, organize, link, and/or combine user-specified electronic media 150. For example, a user may utilize a GUI provided via the accessory control application 116 to identify and select images, illustrations, audio clips, videos, text notes, and/or other electronic media 150 to be included in a media stack 145. The media stack 145 can include a data model that associates all of the selected electronic media 150, and packages the selected electronic media 150 into a container, which can be transmitted to the wearable electronic accessories 160 for display or output.

In certain embodiments, the wearable electronic accessories 160 can represent a smart necklace and/or other type of accessory that can be worn around a user's neck. In such embodiments, the wearable electronic necklace accessory can include at least one support 112 and at least one pendant portion 114.

The configuration of the support 112 and pendant portion 114 can vary. The support 112 can generally include any structure that is capable of permitting the wearable electronic accessory 160 in a user's neck region. For example, the support 112 may include a chain, cord, or connector that permits the wearable electronic necklace accessory 160 to be worn around a user's neck. The pendant portion 114, in some cases, can include a locket, ornament, and/or other similar structure that can be connected to the support.

In some cases, the pendant portions 114 can be connected to the support 112 using one or more connectors. The types of connectors can vary. In some cases, the connector may be a mechanical structure (e.g., one that includes an opening for receiving a chain, cord, and/or other support 112). Additionally, or alternatively, the one or more connectors can include magnetic connectors, hook-and-loop connectors, (e.g., Velcro™), adhesive connectors, snap connectors, press fit connectors, and/or other types of connectors.

The technologies described herein can be integrated in other types of accessories as well (e.g., electronic bracelets, electronic anklets, electronic rings, etc.). In these embodiments, the support 112 may represent any type structure that is capable of attaching the wearable electronic accessories to a region of a user's body (e.g., a user's wrist, ankle, finger, etc.). The pendant portion 114 may including a housing that is connected to the support 112. For example, in some cases, the wearable electronic accessory 160 may be a wearable electronic pocket watch. In this scenario, the support 112 can be a pocket watch chain (or similar structure) and the pendant portion 114 can be a timepiece and/or clock device that is connected to the pocket watch chain. In another example, the wearable electronic accessory 160 can be a wearable electronic wrist accessory. In this scenario, the support 112 can be a wristband, wristlet, and/or wrist connecting structure, and the pendant portion 114 can be coupled to the wristband, wristlet, and/or wrist connecting structure (e.g., similar to smart watch).

In certain embodiments, the accessory control applications 116 can be installed on the electronic devices 110 as local applications. Additionally, or alternatively, the accessory control applications 116 can be installed on the one or more servers 120, and the accessory control applications 116 can be accessed (e.g., via a web browser) by the electronic devices 110, peripheral devices 180, and/or wearable electronic accessories 160 over the network 118. For example, in some cases, the media platform 130 can provide the accessory control applications 116 disclosed herein as a software-as-a-service and/or web-based application. Additionally, or alternatively, the accessory control applications 116 can be installed on both the electronic devices 110 and the servers 120 hosting the media platform 130. For example, the accessory control applications 116 can be installed as front-applications that communicate with one or more back-end applications stored on the one or more servers 120 and/or media platform 130. The accessory control applications 116 can be installed and/or executed in other configurations and arrangements as well. Regardless of the particular arrangement, it should be recognized that any functionality of the accessory control applications 116 described herein can be executed by the electronic devices 110, servers 120, wearable electronic accessories 160, peripheral devices 180 and/or a combination of the four.

In certain embodiments, the media platform 130 can represent an online platform that communicates with the electronic devices 110 over the network 118, and provides various processes that support the functionality of the accessory control applications 116 installed on the electronic devices 110. In some cases, the media platform 130 can permit users to back up and/or store electronic media 150 and/or media stacks 145. The media platform 130 also can permit users to download and/or purchase electronic media 150 (e.g., art, illustrations, photos, etc.) to be included in media stacks 145. The media platform 130 also can perform functions associated with facilitating or authorizing requests to share media stacks, and/or other related functions.

As mentioned above, the accessory control applications 116 can be stored and executed by the electronic devices 110 and/or the server 120. The functionality of the accessory control applications 116 can vary. In certain embodiments, the accessory control applications 116 can include the following components: a set-up module 142; a database 144; a sharing module 146; and a stack management module 148. Each of these exemplary components are described in further detail below.

The set-up module 142 can execute functions that associate or link one or more wearable electronic accessories 160 to the accessory control application 116. For example, a user can utilize one or more GUIs provided by the set-up module 142 to pair the wearable electronic accessories to the accessory control application 116. The set-up module 142 also can perform functions associated with creating accounts for users and facilitating functions for logging into a user's account.

In certain embodiments, when a user initially activates or executes the accessory control application 116, the set-up module 142 prompts the user to either sign into a user account or register a new account. The set-up module 142 can initiate an authentication through a login tool. If the user is using an email and password combination, their credentials can be authenticated directly through the server 120. After a user has logged into a user account, the set-up module 142 enables the user to then pair and link one or more wearable electronic accessories 160 and/or peripheral devices 180 to the user account. The set-up module 142 can further enable the user to register the wearable electronic accessories 160 and/or peripheral devices 180 with the server 120 and link it with the accessory control application 116. In the event wearable electronic accessory 160 is already registered, the accessory control application 116 can send a request to transfer ownership, thereby adding the wearable electronic accessory 160 to the current user's account if verification is confirmed.

In some embodiments, the set-up module 142 can connect wearable electronic accessories 160 and/or peripheral devices 180 to a user's mobile device (e.g., electronic device 110) via the accessory control application 116 without a wireless communication protocol. In some embodiments, the set-up module 142 can monitor for a compatible USB OTG (On-The-Go) connection. When the wearable electronic accessory 160 is connected to the electronic device 110, the set-up module 142 will request a status report from the wearable electronic accessories 160 on-board controller. If available, the set-up module 142 will initialize a synchronization procedure that can be used to transfer media stacks 145 and/or electronic media 150 to the wearable electronic accessories 160.

In some embodiments, the database 144 is included within the accessory control applications 116 local storage. The database 144 can store any electronic media 150 and/or electronic media stacks 145 created or uploaded by the user. As described in further detail below, media stacks 145 stored in the database can utilize an object data structure to organize and associate various electronic media content.

In some embodiments, the sharing module 146 enables a user of the electronic device 110, peripheral devices 180 and/or wearable electronic accessories 160 to share and send media stacks 145 to other users. In some embodiments, the sharing module 146 allows users to establish connections with other electronic devices 110, peripheral devices 180 and/or wearable electronic accessories 160, and to share and send compiled media stacks 145 to other users. The sharing module 146 can generate a GUI that permits a user to add a new contact and/or select others user that a user desires to share media stacks 145 with via the accessory control application 116. In some embodiments, the sharing module 146 enables the other users to accept or decline media stacks 145 that are transmitted to them by other users.

In some embodiments, the communication protocol 190 can include Near Field Touch communication (i.e., touch-based Near-Field Communication) to enable two or more devices (e.g., electronic devices 110, wearable electronic accessories 160, peripheral devices 180, etc.) to be touched back-to-back with each other to establish a Bluetooth, Wi-Fi, or similarly capable connection via handshake. A device also may potentially be touched to an NFC-enabled Application Host device to establish a similar connection. This may be used to activate local sharing with another's device, to add another User as a Friend, to pair the device with an Application and thus, with a User Account to register the device, or to interact with other touchpoints or devices to enable external, subscriptive, localized, or collective functionalities. In some embodiments, the communication protocol 190 can utilize Mid-Range Proximity communication. For example, Mid-Range connectivity between devices such as Bluetooth, Wi-Fi, or other similar connections enable the packeted transfer and synchronization of information, messages, media, or other content necessary to provide functionality to the devices. Devices with established paired connections may use these connections to broadcast status indicators, to scan for new or existing devices, or to capture other communicated signals. These connections may be used to provide additional functionality to two or more devices in near ongoing or passing proximity, to exchange data or enable experiences experienced among other device or Application Users, such as the sharing of messages, or the experience of special effects or activities, among Friends in Circles, for example, to offer driven interactions to encourage User behavior based on their activity.

In some embodiments, the stack management module 148 can execute functions for creating, editing, deleting, and/or organizing the media stacks 145. For example, the stack management module 148 can permit users to add images (or other electronic media 150) to a media stack 145 and remove images (or other electronic media 150) from an existing media stack 145. Additionally, the stack management module 148 can compress electronic media files included in the media stacks 145 to conserve computing resources, which, in some cases, may be limited on the wearable electronic accessories 160 due to size constraints. The media stacks 145 created using the stack management module 148 can be transmitted to one or more wearable electronic accessories 160 that are linked to the accessory control application 116.

In some embodiments, a user may utilize a GUI provided by the stack management module 148 to synchronize the accessory control application 116 with a wearable electronic accessory 160, select one or more media stacks 145, and transmit the selected media stacks 145 to the wearable electronic accessory 160 and/or peripheral devices 180. In some embodiments, a unique local database object (Device-Collection) is created within the database 144 that indicates the contents of each paired wearable electronic accessory 160. This permits the accessory control application 116 to monitor the contents of each wearable electronic accessory 160. A user can access this stored information on a GUI to view the media stacks 145 have been transmitted to, and stored on, each of the wearable electronic accessories 160.

In some embodiments, the stack management module 148 can be configured to crop and/or compresses the electronic media 150 associated with a media stack 145 to be consistent with the aspect ratio of display devices included on the wearable electronic accessories 160 and/or peripheral devices 180. This can be performed prior to sending the media stack 145 to the wearable electronic accessories 160 and/or the peripheral devices 180.

For example, upon selecting media stacks 145 from the database 144 to synchronize to a given wearable electronic accessory 160, the stack management module 148 can present the user with the opportunity to crop all of the images within each selected media stack 145 according to an algorithm (e.g., an artificial intelligence object detection algorithm) using a combination of facial and object recognition for common subjects such as people and pets. Additionally, or alternatively, the stack management module 148 can permit the user to manually align and crop each image (e.g., using a two-finger zoom gesture) to position the image within a visualized frame of their wearable electronic accessories 160.

The cropped ImageFile objects can be stored directly in the database 144 along a reference to the original ImageFile object (ParentImageID). Additionally, a new MediaStack object can be created that also includes a reference to the original object (ParentStackID) value. An additional attribute (Compressed) can be used denote each ImageFile as a cropped copy of the parent object, thereby preventing it from appearing within the database 144 and correlating the cropped object to a specific wearable electronic accessory 160 resolution. If the parent image or media stack 145 is later selected for synchronization to another wearable electronic accessory 160 of the same aspect ratio, the user will have an additional option to use the previously cropped electronic media on the new wearable electronic accessories 160. All final electronic media content is then included in the database 144 entry, as an enumerated list of StackID references calling back to the specially edited and compressed copy of the media stack 145 and its related electronic media 150. In some embodiments, compressed files can be stored in separate ImageFile or AudioFile objects with a corresponding hashed ID and references to the original file through the ParentID attribute. If a user edits a photo within the accessory control application 116, the original image can be hidden from view, but remains within the database 144 for later modifications or reversion of applied edits.

After the user adds content to the media stack 145, the user will be able to add audio to images and/or video files that can be output when the images and/or videos are displayed by a wearable electronic accessory 160. Additionally, or alternatively, the stack management module 148 can permit a user to add audio to the entirety of the media stack 145, which can be output when the electronic media 150 in the stack is output by a wearable electronic accessory 160 (e.g., a single audio clip can be played while the images and videos are consecutively output). The stack management module 148 also can display a tool that enables users to edit audio clips (e.g., using clip and cut tools) that are being added, as well as tools for and overwriting audio that is included in the electronic media 150 associated with the media stack 145.

In some embodiments, the stack management module 148 can organize and rearrange media stacks within gallery collections. From a gallery screen interface, the user can drag media stacks between custom gallery collections to store and display their content more easily. Upon tapping and holding a media stack 145, the user may choose to move it into to an existing collection or down into a tray to create a new collection. The user may additionally name or rename collection titles using the interface.

In some embodiments, the stack management module 148 permits users to add existing electronic media 150 content (e.g., images, videos, audio files, etc.) from an existing media stack 145 to new or separate media stack 145. For example, when appending electronic media 150 to a media stack 145, the user can select an option to add existing electronic media already stored within the database 144. An internal file selector can permit the user to navigate through the electronic media 150 and to link electronic media 150 from existing stacks.

In some embodiments, the stack management module 148 can further permit users to organize and rearrange media stacks 145. For example, the stack management module 148 can provide tools that allow for renaming and/or reordering of the media stacks. Stacks can be freely reordered within the current collection or moved between collections using the on-screen controls, which will update the associated collection entries in the database.

In some embodiments, the stack management module 148 can permit users to delete electronic media 150, media stack containers, and gallery collections. For example, a media stack edit screen can permit users to select unwanted images, videos, and/or audio recordings to be removed from a particular media stack 145. In some cases, the same image, video, and/or audio files may belong to multiple media stacks 145. When a user chooses to delete a file linked to multiple media stacks 145, the file may be deleted from the current media stack 145 and/or all linked media stacks 145. Similarly, a media stack 145 itself can be deleted, thereby deleting all electronic media 150 that is not linked to another stack.

In some embodiments, the stack management module 148 includes a synchronization module 149 that can execute a background synchronization process that causes selected media stacks 145 and/or electronic media 150 to be synchronized with a designated wearable electronic accessory 160. In some cases, before attempting to synchronize any data with the wearable electronic accessory 160, the synchronization module 149 initially establishes a connection with the wearable electronic accessory 160 and sends a status request to the paired wearable electronic accessory 160.

After the wearable electronic accessory 160 sends a response signal indicating that it is ready for synchronization, the synchronization module 149 can transmit one or more selected media stacks 145 to the wearable electronic accessory 160. The wearable electronic accessory 160 may return a packaged version of its database (or media stack) back to the electronic device 110, which can be used by the accessory control application 116. The packaged database can be analyzed by the synchronization module 149 and compared to the media stack 145 that was transmitted to the wearable electronic accessory 160 in order to confirm that all media stacks 145 (and associated electronic media 150) were successfully transferred to the wearable electronic accessory 160. If the content matches, the wearable electronic accessory 160 is understood as being synchronized.

If the content received in the packaged database does not match, the synchronization module 149 identifies which electronic media items are missing from the wearable electronic accessory 160, and begins transferring these individual electronic media items to the wearable electronic accessory 160. Once the process is completed, synchronization module 149 verifies the synchronization one last time following a status request from the electronic device 110 containing the updated local DeviceCollection database. Any discrepancies or lost data is repackaged for another attempted synchronization. If at any point the synchronization process is interrupted due to a faulty or lost connection, the synchronization module 149 may halt the connection and assume the wearable electronic accessory 160 is not up to date. Additionally, a synchronization error may be displayed to the user on the electronic device 110.

The content stored on the wearable electronic accessory 160 can be verified again upon reconnection regardless of the previous connection status. This can be useful in scenarios where the wearable electronic accessory 160 synchronizes in the absence of an electronic device host, or in situations where the wearable electronic accessory 160 received new content separately from the electronic device 110. If the wearable electronic accessory 160 includes content that is not native to the electronic device, this new electronic media can be identified and discovered during the status report phase and requested for transfer to the electronic device 110 for storage. In some cases, the media stack 145 can be retrieved from the original creator or provider of the content, and added to the gallery collection on the electronic device 110 as if it was received directly through sharing.

In some embodiments, the synchronization module 149 can synchronize electronic media content to the wearable electronic accessory 160 using a wireless communication connection (e.g., Bluetooth or Wi-Fi connection). In some embodiments, the synchronization module 149 can synchronize data between the application and wearable electronic accessory 160 using a wired connection (e.g., a USB connection). After a wired connection is established, the application will automatically check the wearable electronic accessory 160 internal database against the local copy included on the accessory control application 116. If the databases differ (indicating that the wearable electronic accessory 160 is not up to date), the accessory control application 116 will automatically begin the process of transferring and resynchronizing data, thereby updating the wearable electronic accessory 160 database accordingly to match the application gallery.

In certain embodiments, the peripheral devices 180 can include various input devices, output devices, and/or communication devices that have been included and described in this disclosure. In some embodiments, exemplary peripheral devices 180 can include a smart speaker such as Amazon Alexa or Amazon Echo. In such an embodiment, the accessory control application 116 can send commands to output a media stack and transmit the media stack to the peripheral device 180. For example, the media stack can comprise an audio file and the audio file can be output by the peripheral device 180. In some embodiments, exemplary peripheral devices 180 can include a smart television. In such an embodiment, the accessory control application 116 can send commands to output a media stack and transmit the media stack to the peripheral device 180. For example, the media stack can comprise an audio file and a video file and the audio and video files can be output by the peripheral device 180 (e.g., displayed on the smart television). In some embodiments, exemplary peripheral devices 180 can include a smart set-top-box such as AppleTV, RokuTV, or Amazon Firestick. In such an embodiment, the accessory control application 116 can send commands to output a media stack and transmit the media stack to the peripheral device 180. For example, the media stack can comprise an audio file and a video file and the audio and video files can be transmitted to the smart set-top-box and subsequently displayed on a television. In some embodiments, a voice command can be given to a first peripheral device 180 (e.g., smart speaker) which can execute a command via the accessory control application 116 to transmit and display a media stack on a second peripheral device 180 (e.g., smart television) and/or a wearable electronic accessory 160.

Figure 2:
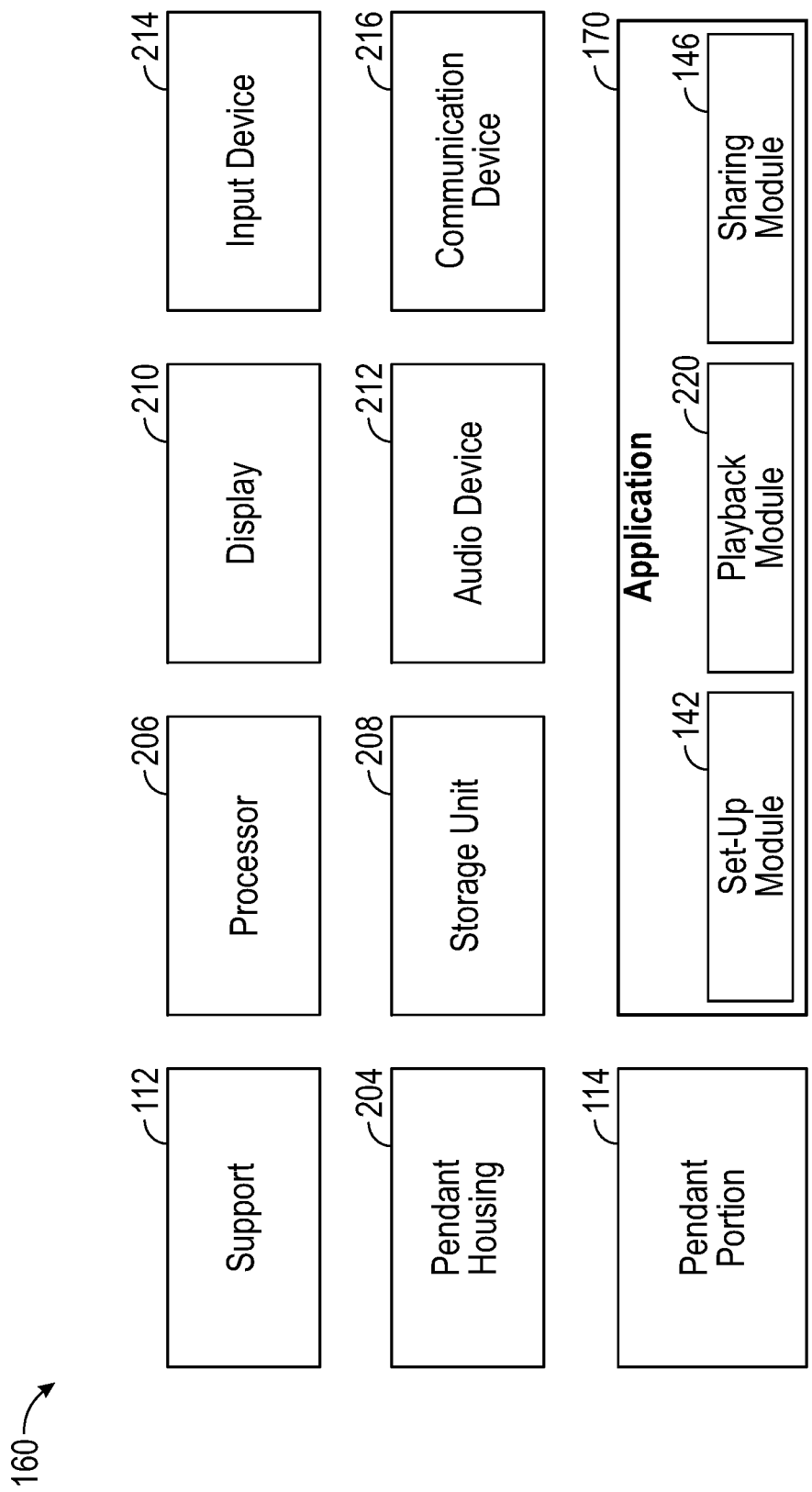
FIG. 2 is an exemplary wearable electronic accessory in accordance with certain embodiments.

FIG. 2 discloses an exemplary wearable electronic accessory 160 according to certain embodiments. The wearable electronic accessory 160 can include, inter alia, the support 112, the pendant portion 114, a pendant housing 204, a processor 206, a storage unit 208, a display 210 (e.g., a graphical user interface), an audio device 212, an input device 214, and a communication device 216. In some embodiments, the wearable electronic accessory 160 can include the application 170. In some embodiments, the application 170 can include the set-up module 142, the sharing module 146, and a playback module 220. In some embodiments, the playback module 220 enables the wearable electronic accessory 160 to playback media stacks received from an electronic device 110 on the display 210.

In some cases, users or operators of the wearable electronic accessory 160 may utilize various gestures to make selections and/or provide inputs via the one or more displays 210 and/or input devices 214. Other input devices 214 (e.g., scroll wheels, mouse devices, keyboards, input buttons, etc.) also may be utilized to make selections and provide inputs.

In certain embodiments, each of the one or more displays 210 can include both a display device (e.g., an LCD or liquid crystal display) and capacitive sensing medium that is configured to detect touches and gestures. In some cases, the capacitive sensing medium can be configured to detect the location where the display 210 is engaged or touched by an object (e.g., a user's figurer or stylus), the time and duration of each engagement or touching of the display 210, and/or the pressure exerted each instance the display 210 is engaged or touched. The capacitive sensing medium also can to generate signals indicating the same. The capacitive sensing medium can include one or more sensors that utilize capacitive sensing, resistive sensing, surface acoustic wave sensing, strain gauges, force sensitive resisters, load cells, pressure plates, piezoelectric transducers, and/or the like to detect the aforementioned parameters.

The capacitive sensing medium can be configured to detect various types of gestures. Exemplary gestures that may be utilized to provide inputs via the capacitive sensing medium and/or display 210 can include:

(1) Tap Gestures: Touch or tap one finger on the display 210.
(2) Touch and Hold Gestures: Touch the display 210 and hold in place for a predetermined period of time (e.g., 1-3 seconds).
(3) Swipe Gestures: Touch the display 210, and move or drag a finger in a direction across display 210.
(4) Scroll Gestures: Move or drag one finger across the display 210 without lifting, and capable of moving bi-directionally (e.g., up and down or side to side).
(5) Zoom Gestures: Place two fingers on the display 210 near each other and spread them apart to zoom in, or move them toward each other to zoom out.

Other types of gestures also may be utilized to provide inputs and selections via the capacitive sensing medium and/or display 210.

In some embodiments, the input devices 214 can include one or more mechanical scroll wheels (e.g., crown-type scroll wheels) integrated into the housing 204, and rotatable to specify inputs and/or selections. For example, the mechanical scroll wheels can be rotated to change the electronic media 150 (e.g., images, videos and/or audio) that is output by the wearable electronic accessory 160. The structure of the mechanical scroll wheels can vary. In some cases, a mechanical scroll wheel can include a ratcheted and/or detented structure, and the mechanical scroll wheel can be rotated in a clickable and/or non-clickable (e.g., smooth) fashion.

In some embodiments, the support 112 can be a necklace, chain, cord, and/or other structure that allows the wearable electronic accessory 160 to be worn by a user. In some embodiments, the support 112 can be comprised of metal, plastic, rubber, or any other type of material suitable for support on a portion of a user's body. In some embodiments, the support 112 includes an engaging portion that is coupled to the pendant portion 114 via the pendant housing 204.

In some embodiments, the pendant portion 114 is a locket or other device that includes the display 210. The pendant portion 114 can include a pendant housing 204, which is constructed from rigid or semi-rigid materials (e.g., metals, plastics, wood, etc.). The pendant housing can include an enclosure that is equipped with the processor 206, the storage unit 208, the display 210, the audio device 212, the input device 214, and/or the communication device 216.

The configuration of pendant housing 204 can vary. In certain embodiments, the pendant housing 204 at least includes a first wall (e.g., which faces outwardly from a user when the wearable electronic accessory is worn), a second wall (e.g., which faces toward a user's body when the wearable electronic accessory is worn), and one or more side walls for connecting the first wall and the second wall. The display device 210 can be integrated into the first wall to enable electronic media to be displayed. Additionally, one or more openings can be incorporated one of the walls (the first wall, second, and/or one or more side walls) to permit output of audio content from audio devices 212 included within the housing.

The first wall, second wall, and one or more side walls of the housing can form an enclosure that includes a spacing situated between the first and second walls. Any or all of the following components can be included within the enclosure: one or more audio devices 212, one or more audio amplifier devices, one or more communication devices 216, one or more displays 210, one or more display controllers (e.g., for controlling the one or more displays 210), one or more processors 206, one or more storage devices 208, one or more printed circuit boards, one or more power control boards, one or more batteries, one or more input/output (I/O) control boards, one or more microphones, and/or one or more connectors for electrically coupling the electronic components. In some cases, one or more batteries included within the enclosure are utilized to power all of the components included in the pendant portion 114.

In some embodiments, the housing 204 also may include a locket cover (e.g., a hinged cover that can be rotated between open and closed positions). In the closed position, the locket cover may conceal the display 210 integrated into the pendant portion 114. In the open position, the locket cover may permit the display to be visible.

In some embodiments, the processor 206 can include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

In some embodiments, the storage unit 208 can be a computer storage device. The storage unit 208 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices can be physical, non-transitory mediums. In some embodiments, the application 170 can be stored in the storage unit 208.

In some embodiments, the audio device 212 can include one or more speakers, one or more audio output devices, one or more microphones, and/or one or more audio amplifier devices.

In some embodiments, the one or more communication devices 216 can include a transceiver device and/or a wire-based communication device or interface. The communication device 216 can be configured to communicate directly with other electronic devices 110 and/or wearable electronic accessories 160 over the network 118 via wired or wireless communication links, or a combination of the two. In some embodiments, the communication device 216 enables pairing of electronic devices 110 and wearable electronic accessories 160 via wireless communication protocols (e.g., Wi-Fi, Bluetooth, etc.). In some embodiments, the communication device 216 can be a near-field-communication (NFC) device that enables communication directly between wearable electronic accessories 160.

In some embodiments, the wearable electronic accessory 160 can include one or more printed circuit boards, one or more power control boards, one or more batteries, one or more input/output (I/O) control boards, and/or one or more connectors for electrically coupling the electronic components. In some embodiments, the wearable electronic accessory 160 can include an internal microcontroller, a rechargeable battery with wireless charging coils, and Bluetooth or Bluetooth Low Energy connection capabilities.

Figure 3:
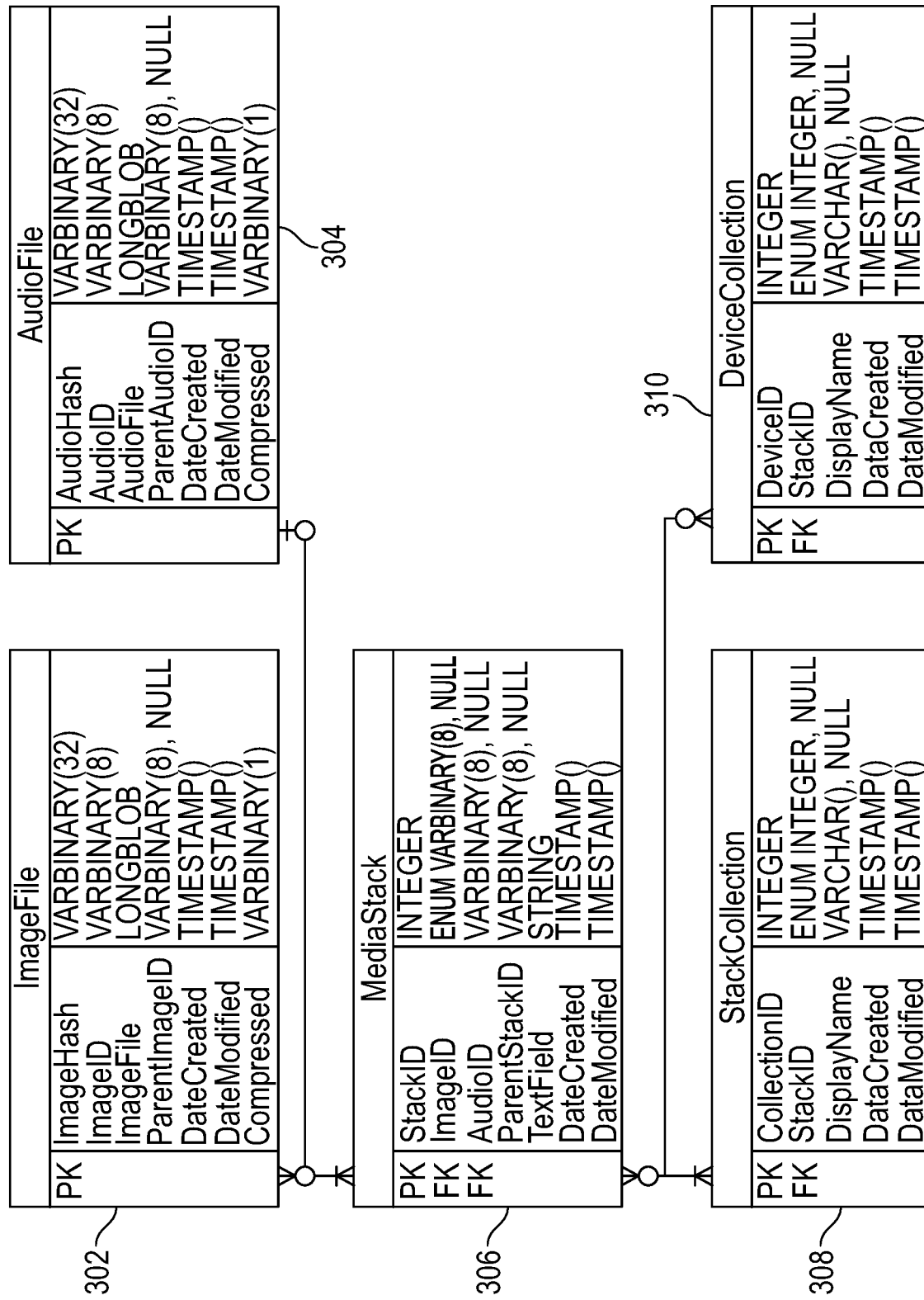
FIG. 3 is an exemplary data structure for a media stack according to certain embodiments.

FIG. 3 illustrates an exemplary data structure 300 for a media stack according to certain embodiments. The data structure 300 can include, inter alia, an image file object 302, an audio file object 304, a media stack object 306, a stack collection object 308, and a device collection object 310. The media stack object 306 is linked to each of the image file object 302, audio file object 304, stack collection object 308, and a device collection object 310. In some cases, the data structure 300 may additionally include objects corresponding to video files and/or other multimedia files, and these additional objects also can be linked to the media stack object 306.

The image file object 302 and audio file object 304 can be used to associate image and audio files with a media stack 145, and they store corresponding information associated with the image and audio files. In some embodiments, "ImageHash" and "AudioHash" attributes can include the SHA265 hash of an original electronic media file. Duplicated or edited files may be created when electronic media files are compressed and/or edited, and they can be assigned a new unique hash. In some embodiments, "ImageID" and "AudioID" can include a truncated 8-byte representation of the ImageHash and AudioHash values. In some embodiments, "ImageFile" and "AudioFile" can include the raw data of the file itself, or a reference to the name of the file in the storage space. In some embodiments, "ParentImageID" and "ParentAudioID" can include pointers that identify locations of original image and audio files after a duplicate file is made (e.g., when compressed electronic media files are created as duplicates of the original, uncompressed parent files). In some scenarios, the values of these attributes may be set to null, indicating the current entry is an unmodified parent file. The "compressed" attribute can store information identifying the type, resolution, and aspect ratio of a wearable electronic accessory 160 for which a cropped and compressed file is created.

In some embodiments, the media stack object 306 can be used to define a media stack 145. The media stack object 306 can be linked to user-added electronic media. In some embodiments, the "ParentStackID" attribute points back to the original stack of any unique media stack objects 306 created with compressed electronic media intended to be synchronized with a wearable electronic accessory 160. These may be related or linked to one or more device collection objects 310.

In some embodiments, the media stack object 306 also can be linked to the stack collection object 308 and device collection object 310 as mentioned above. The stack collection object 308 can be used to combine multiple media stack objects 306 into a collection that is accessible via the accessory control application 116. The device collection object 310 can store data relating to each individual wearable electronic accessory 160 paired to, or associated with, a user's account. The "DeviceID" attribute can refer to the serial identifier of a wearable electronic accessory 160. Amongst other things, the DeviceID associated with a wearable electronic accessory can be utilized to establish a connection between the wearable electronic accessory 160 and an electronic device 110, and/or sync the wearable electronic accessory 160 with an electronic device 110 (e.g., for transferring media stacks to the wearable electronic accessory).

A stack collection object 308 may hold or include zero or many media stack objects 306. Each stack collection object 308 can include an ordered list of StackIDs that uniquely identify associated media stack objects 306. In some embodiments, multiple stack collection objects 308 can refer to the same media stack object 306. Each media stack object 306 may contain zero or more ImageID references, zero or more AudioID references, and an optional string TextField note. A user may create one or more media stack objects 306 within a root collection by default, or directly within another created collection.

In some embodiments, the database 144 allows image file objects 302 and audio file objects 304 to remain self-sufficient, such that they can belong to multiple media stack objects 306 by reference. When electronic media is added to the database 144 (either by the user or received through the sharing module 146), the accessory control application 116 stores the original, full quality image or audio in a new image file object 302 or audio file object 304 in the database 144 with the primary key generated according to the SHA-256 hash of the original file itself. In some embodiments, this allows the electronic media to remain uniquely identifiable and ensures redundancy between the accessory control application 116 and one or more wearable electronic accessories 160.

Child objects (which may be created due to editing files or compression of electronic media files) are stored in separate ImageFile or AudioFile objects 302, 304 with a corresponding hashed ID and references to the original file through the ParentID attribute. If a user edits a photo within the accessory control application 116, the original image is hidden from view, but remains within the database 144 for later modifications or reversion of applied edits.

In some embodiments, the database entries for ImageFile and AudioFile objects include a LONGBLOB binary storage attribute to hold the electronic media content itself to reduce file transfers over wireless connectivity, thereby ensuring all necessary content is transmitted to wearable electronic accessories 160 within a single verifiable database package. In some embodiments, the binary object may be excluded in favor of transferring raw packeted image and audio files named according to their matching object ID in the database 144.

Additionally, in some embodiments, the database 144 may be cloned to another location, such as a backup server, by packaging the entire database 144 and uploading or exporting as necessary. Due to the rigidity of the database 144, any missing entries (e.g., such as entries corresponding to electronic media file objects, media stack objects, stack collection objects, and/or device collection objects) can be requested or pushed individually for ongoing backup.

Figure 4:
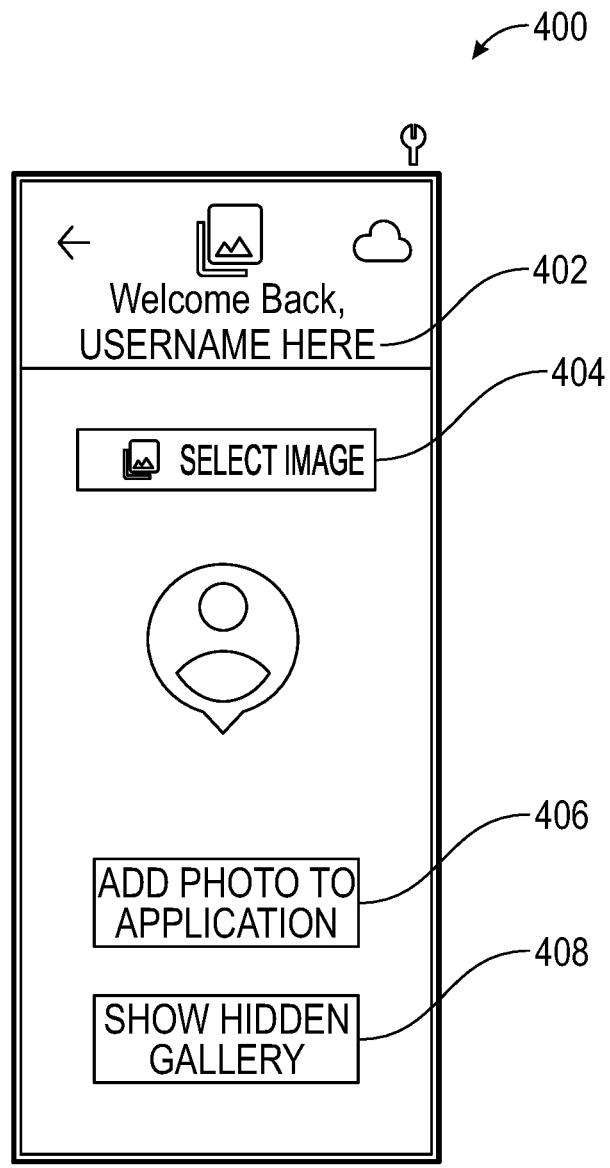
FIG. 4 is an exemplary interface for adding media to an application according to certain embodiments.

FIG. 4 is an exemplary interface 400 that can be displayed by the accessory control application 116 according to certain embodiments. A username 402 associated with a user account may be displayed at the top of the interface 400. The interface also includes an option 404 to select and upload images, an option 406 to add a photo or image to be included in media stacks 145, and an option 408 to display a hidden gallery comprising specified electronic media 150.

Figure 5:
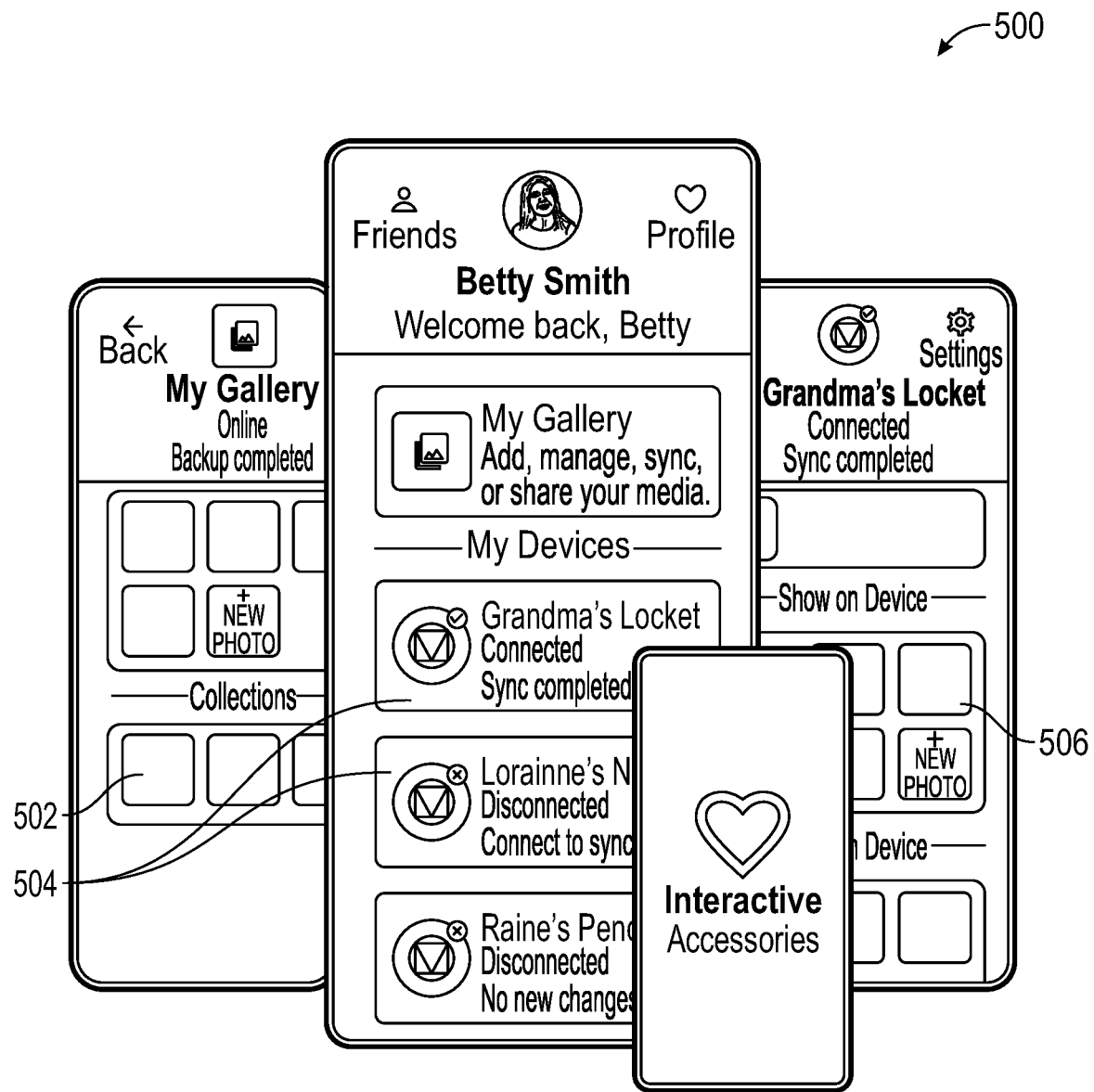
FIG. 5 illustrates exemplary interfaces according to certain embodiments.

FIG. 5 illustrates additional interfaces 500 according to certain embodiments. In some embodiments, the interfaces 500 include collection options 502 that permit users to access various collections of electronic media 150 (e.g., including media stacks 145). The interfaces 500 also include a listing 504 of multiple wearable electronic accessories 160 that have been paired to a user's account 504. The interfaces 500 also include selection options 506 that can be selected to transfer media stacks 145 for display on a wearable electronic accessory 160.

Figure 6B:
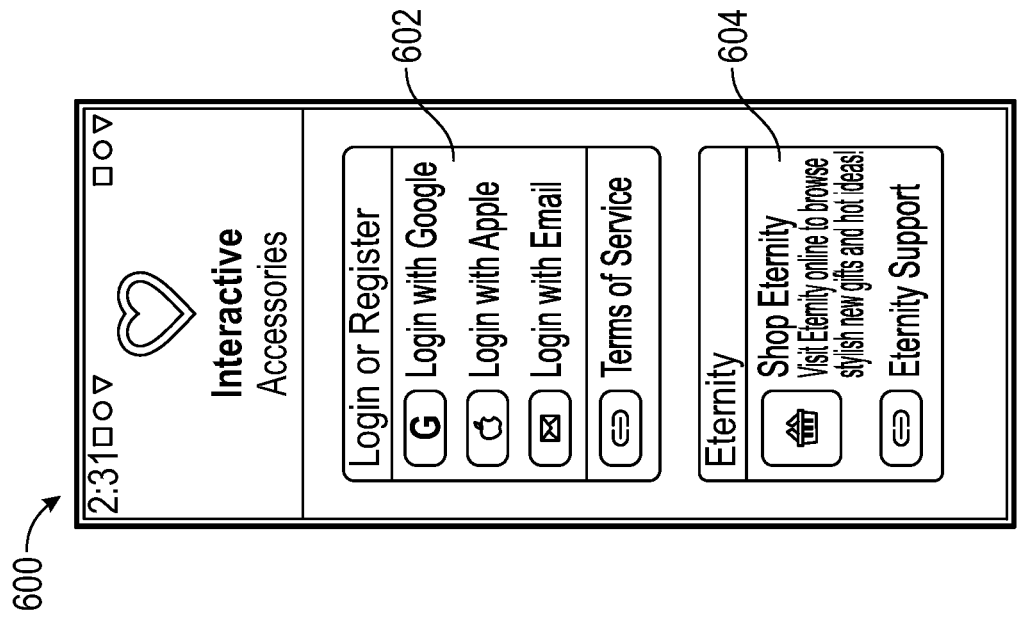
FIG. 6B illustrates an exemplary interface according to certain embodiments.
Figure 6A:
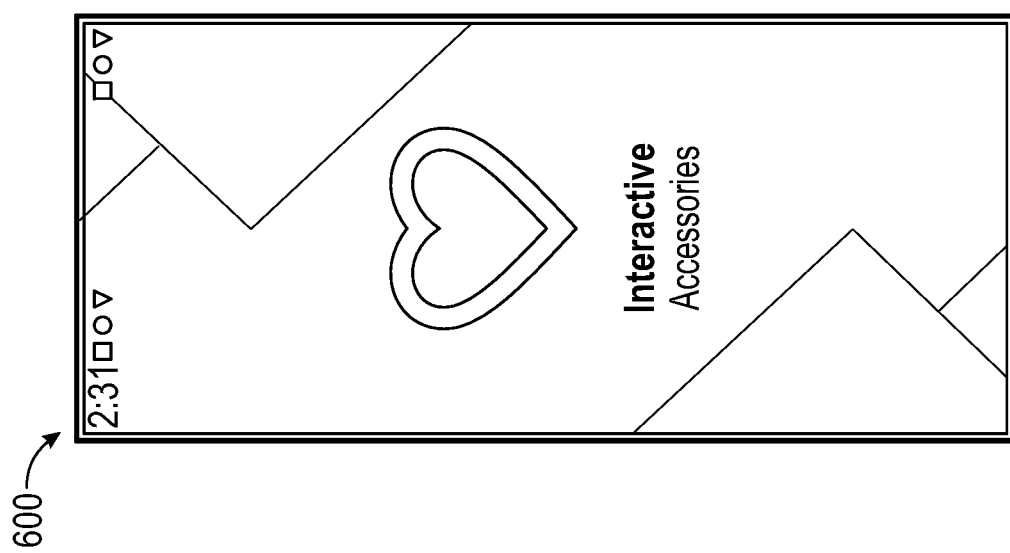
FIG. 6A illustrates an exemplary interface according to certain embodiments.
Figure 6D:
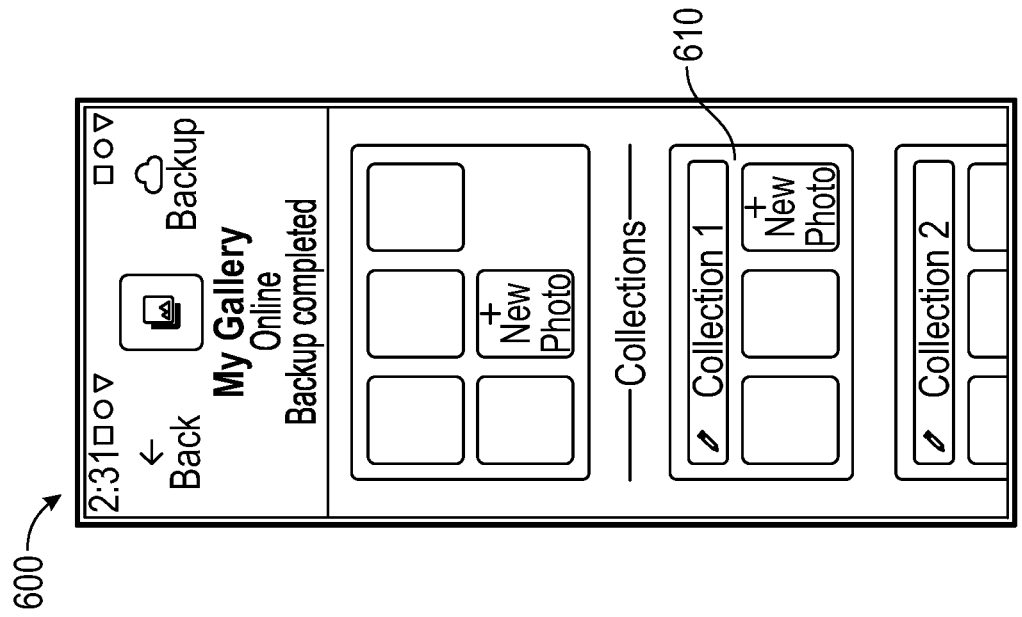
FIG. 6D illustrates an exemplary interface according to certain embodiments.
Figure 6C:
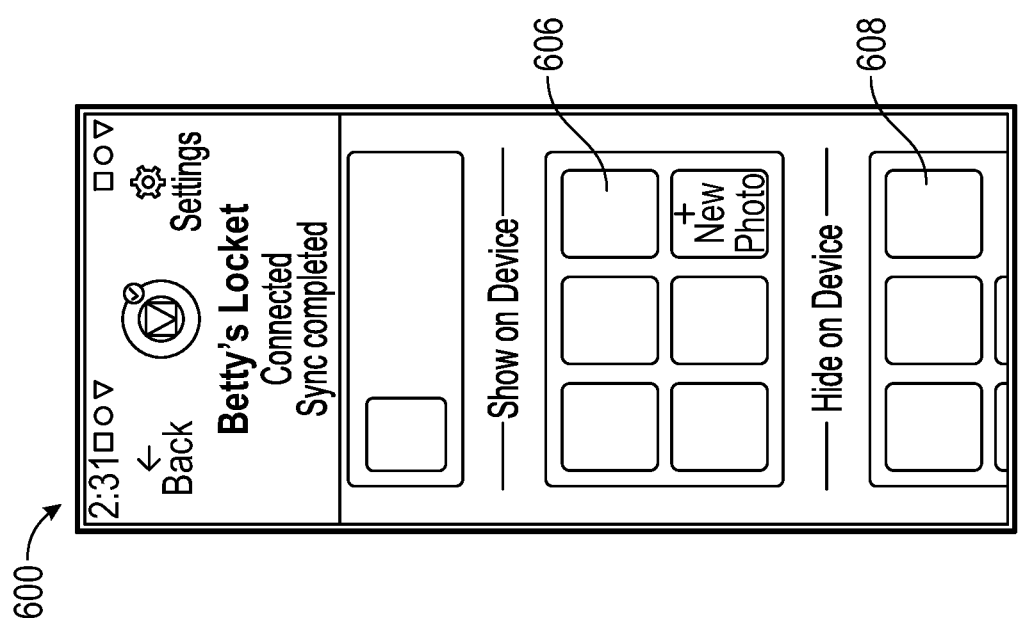
FIG. 6C illustrates an exemplary interface according to certain embodiments.
Figure 6E:
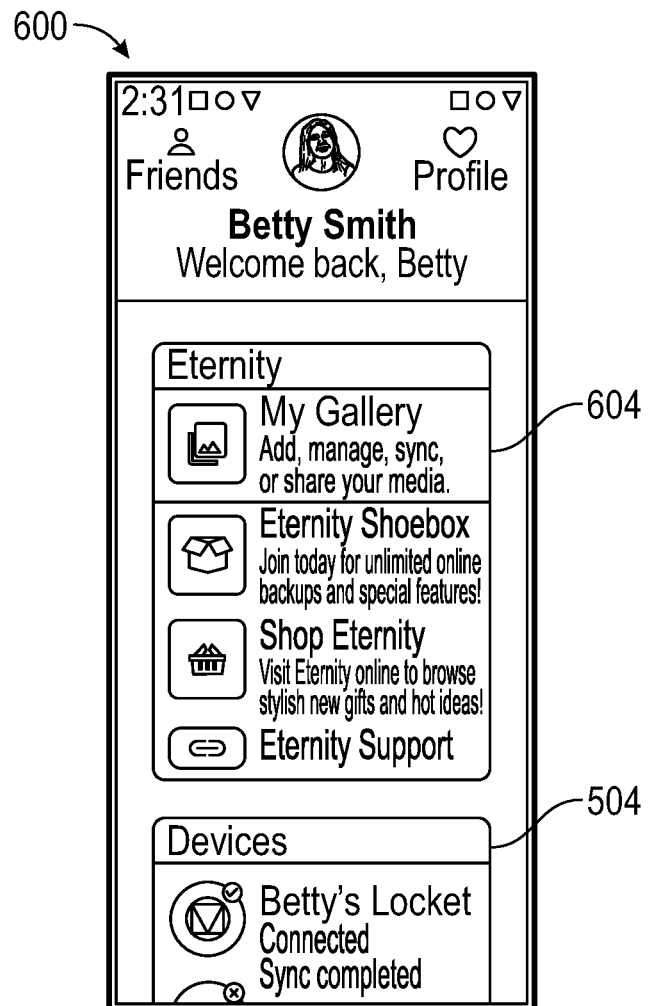
FIG. 6E illustrates an exemplary interface according to certain embodiments.

FIGS. 6A-6E illustrates additional interfaces 600 according to certain embodiments. The interface 600 in FIG. 6A illustrates an exemplary interface when a user opens an accessary control application 116. The interface 600 in FIG. 6B illustrates an exemplary log-in interface that includes a login or register option 602 a user can utilize to register and set-up an account and/or login with an existing account. In some embodiments, the interfaces 600 can include a services section 604, that can include options to add, manage, share and synchronize electronic media 150, set-up a storage account (e.g., database backup), and/or shop gifts or deals on an e-commerce site. The interface 600 of FIG. 6C can include selection option 606 that can be selected to transfer media stacks 145 for display on a wearable electronic accessory. In some embodiments, the interface 600 of FIG. 6C can include selection option 608 that can be selected to hide media stacks 145 from being displayed on a wearable electronic accessory 160. The interface 600 in FIG. 6D can include collection options 610 that permit users to access various collections of electronic media 150 (e.g., including media stacks 145). The interface 600 in FIG. 6E includes the listing 504 of multiple wearable electronic accessories 160 that have been paired to a user's account, and the services section 604 detailed above.

FIG. 7A illustrates an exemplary media stack 700 according to certain embodiments. The media stack 700 can include, inter alia, zero or more note objects 702, zero or more audio objects 704, and zero or more image objects 706.

Each note object 702 can store text content and/or cause a text content to be associated the media stack 700. For example, a user can input a text description for the media stack 700 that identifies a title or name of the media stack 700. Additionally, or alternatively, the textual descriptions associated with the note object 702 can include content that is intended to be output by a wearable electronic accessory 160.

Each audio object 704 can store and/or associate an audio file with the media stack 700. Each image object 706 can store and/or associate an image with the media stack 700. The note objects 702, the audio objects 704, and the image objects 706 can be used to associate notes, images, and audio content with a media stack 145, 700, and this content can be output by a wearable electronic accessory 160 when the media stack 700 is loaded and executed by the wearable electronic accessory 160.

FIG. 7B is a diagram 708 illustrating how a media stack 700 can be stored and related to other objects or data structures associated with collections and galleries.

Figure 8B:
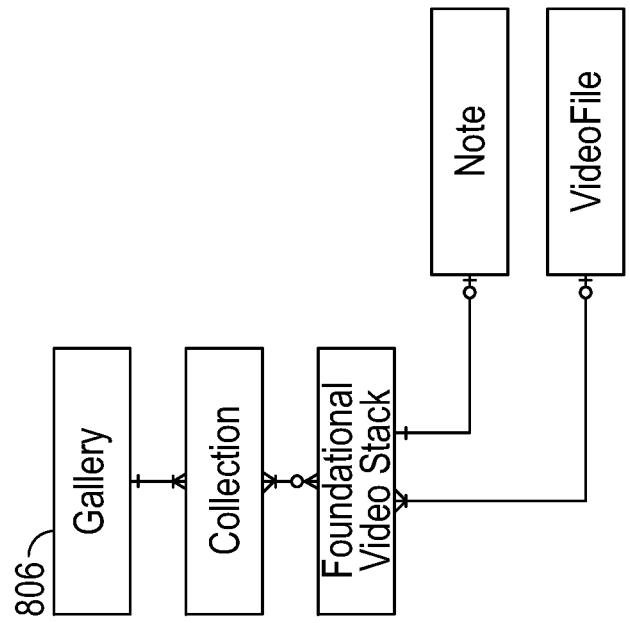
FIG. 8B illustrates an exemplary data structure for the media stack of FIG. 8A according to certain embodiments.
Figure 8A:
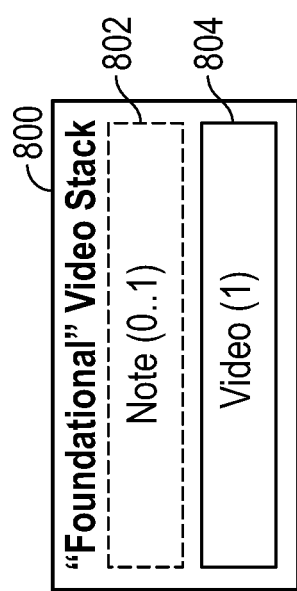
FIG. 8A illustrates an exemplary media stack according to certain embodiments.

FIG. 8A illustrates an exemplary media stack 800 according to certain embodiments. The media stack 800 can include, inter alia, zero or more note objects 802 and zero or more video objects 804. As explained above with reference to FIG. 7A, each note object 802 can store zero or more text descriptions. Each video object 804 can store and/or associate a video file with a media stack 800. The video and note content associated with the media stack 800 can be output by a wearable electronic accessory 160 when the media stack 800 is loaded and executed by the wearable electronic accessory 160.

Figure 9B:
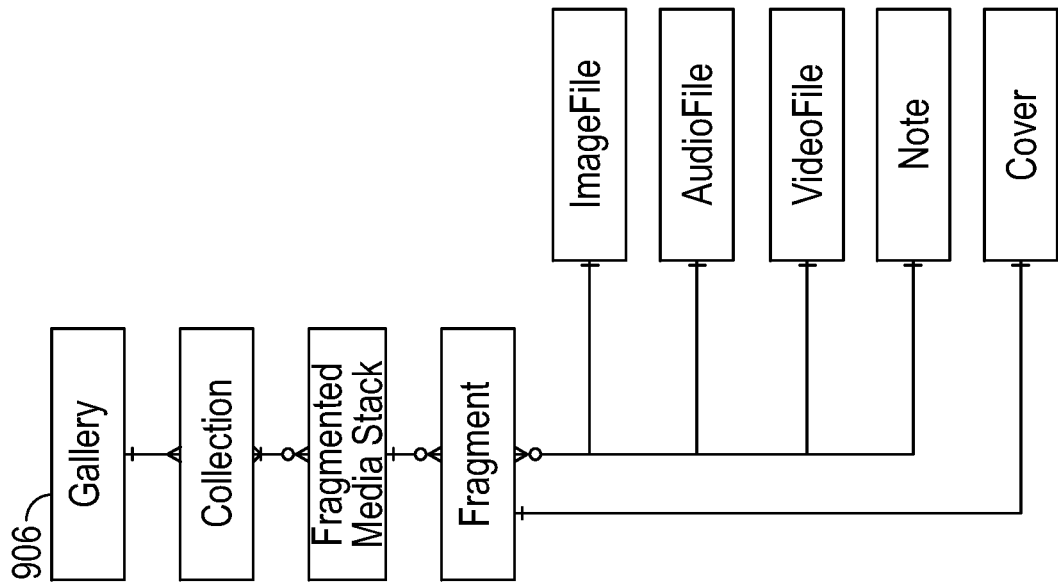
FIG. 9B illustrates an exemplary data structure for the media stack of FIG. 9A according to certain embodiments.
Figure 9A:
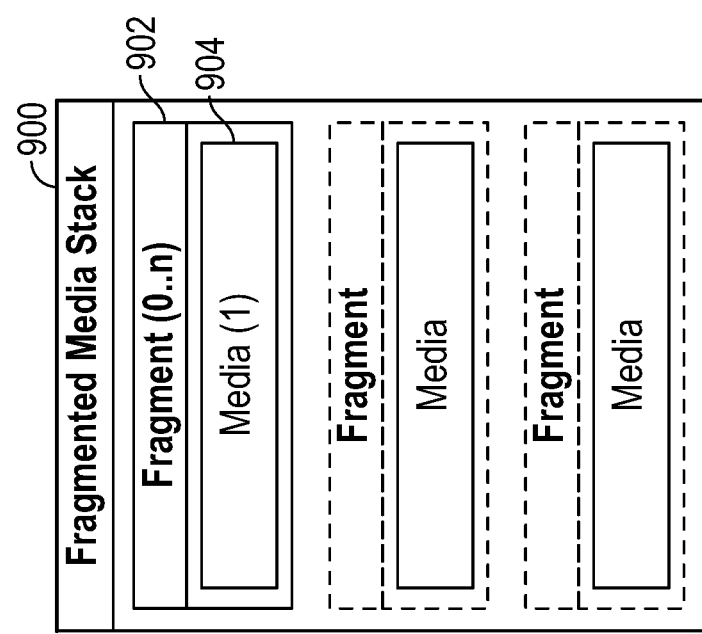
FIG. 9A illustrates an exemplary media stack according to certain embodiments.

FIG. 8B is a diagram 806 illustrating how a media stack 800 can be stored and related to other objects or data structures associated with collections and galleries FIG. 9A illustrates an exemplary media stack 900 according to certain embodiments. The exemplary media stack 900 can include zero or more fragment objects 902, each of which can is capable of associating any type of electronic media 904 (e.g., text, audio, video, images, etc.) with the media stack 900. In this manner, this configuration a versatile data structure that allows for flexibility in the types of media 904 being associated with the media stack 900.

In certain embodiments, the fragment objects 902 can be configured such that the media stack 900 does not directly reference files corresponding to the electronic media 904. Rather, the fragment objects 902 included in the media stack 900 can utilize a dynamic pointer to facilitate callback of media files that have been edited without requiring a systematic update to the gallery where every original media stack reference appears. The media stack 900 having fragment objects 902 enables a decentralized sharing experience in which media stacks available or shared online may need to be retroactively updated from a user's local content (or vice versa, in which new messages and content shared to the cloud may require a local object stored in a user's own gallery to update with new content).

The fragment objects 902 can function as a container for any type of media 904 (including ImageFile, AudioFile, VideoFile, and Note objects). The media 904 associated with a given fragment object 902 may belong to any number of fragment containers 902, and can be included amongst any number of media stacks 900. In some embodiments, the media stack 900 can include a Cover object to associate the fragment containers 902 with the media stack 900. The media stack 900 with this configuration improves sharing abilities by allowing media stacks 900 to coexist as attached media messages sent among various users or as social posts within the context of a shared Circle (e.g., a group of a users that share electronic media).

FIG. 9B is a diagram 906 illustrating how a media stack 900 can be stored and related to other objects or data structures associated with collections and galleries.

Figure 10A:
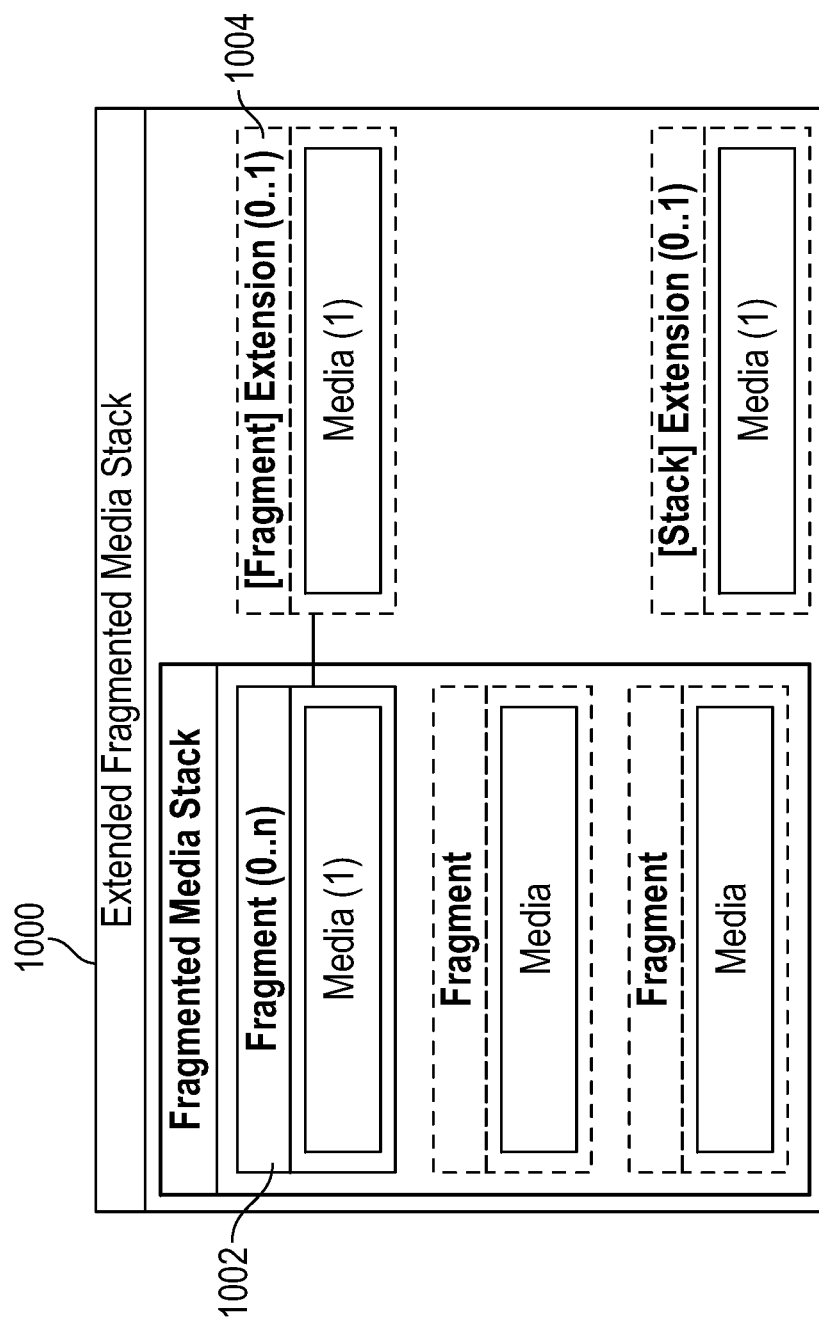
FIG. 10A illustrates an exemplary media stack according to certain embodiments.

FIG. 10A illustrates an exemplary media stack 1000 according to certain embodiments. The media stack 1000 includes zero or more fragment objects 1002, each of which include zero or more extension objects 1004. The extension object 1004 can function as a container for nested media content. The extension object 1004 functions similarly to a fragment object 1002 by containing a single media element of any standard type and allows users to add extensive media onto existing media stacks (either manually or dynamically through user-guided interfaces) to provide additional context to the database. For example, the extension container 1004 can include personal messages written by a User or sent with shared media stacks, audio or video recordings generated in response to the media in the media stack, or journaled notes and recordings related to the event in the media, or User comments posted to or shared alongside the media stack 1000 as it is sent among Friends or Circles. In some embodiments, the media in the extension object 1004 may or may not be viewed on the wearable electronic accessory 160 and may or may not be shared along with the internal contents of the media stack 1000.

Figure 10B:
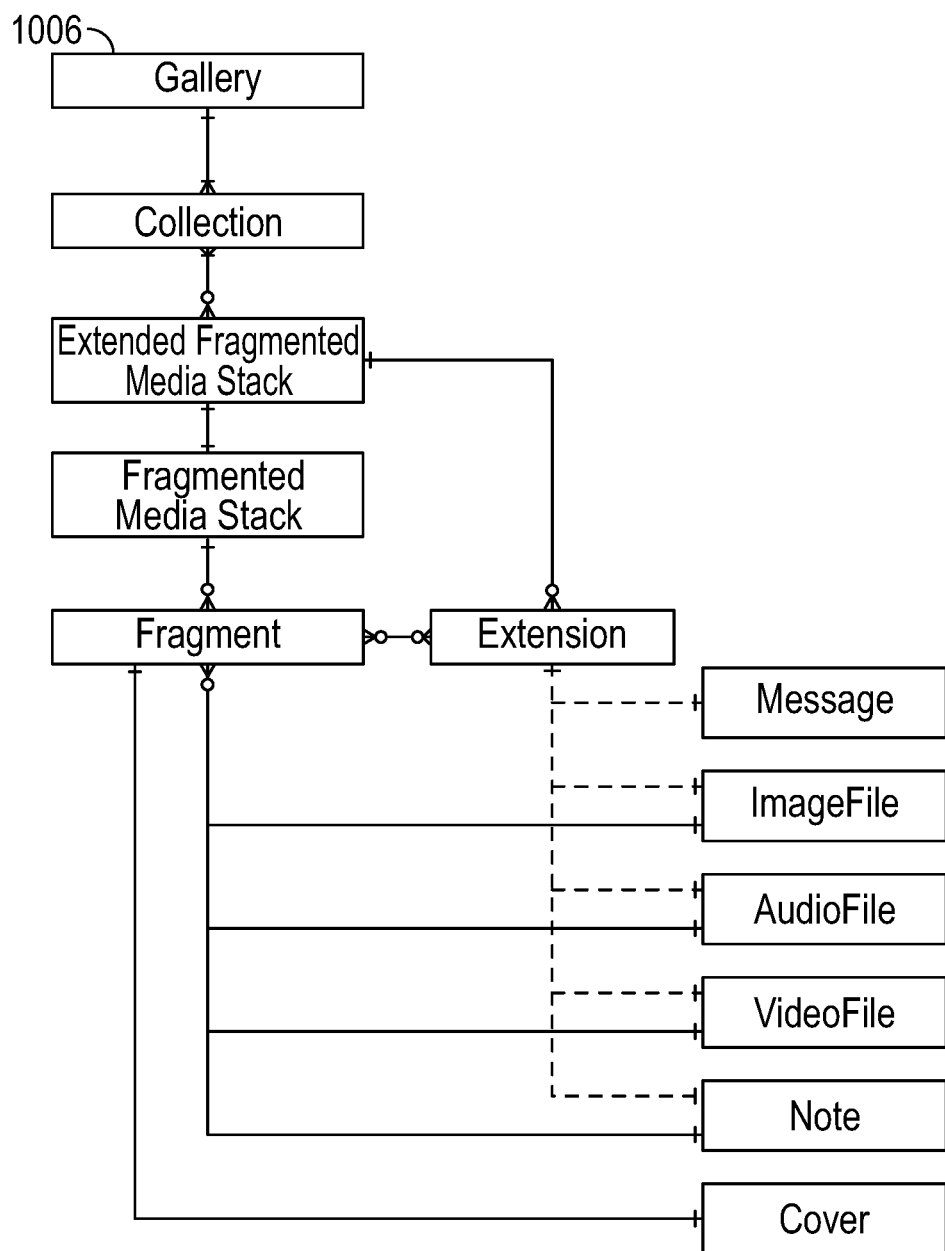
FIG. 10B illustrates an exemplary data structure for the media stack of FIG. 10A according to certain embodiments.
Figures 11A, 11B:
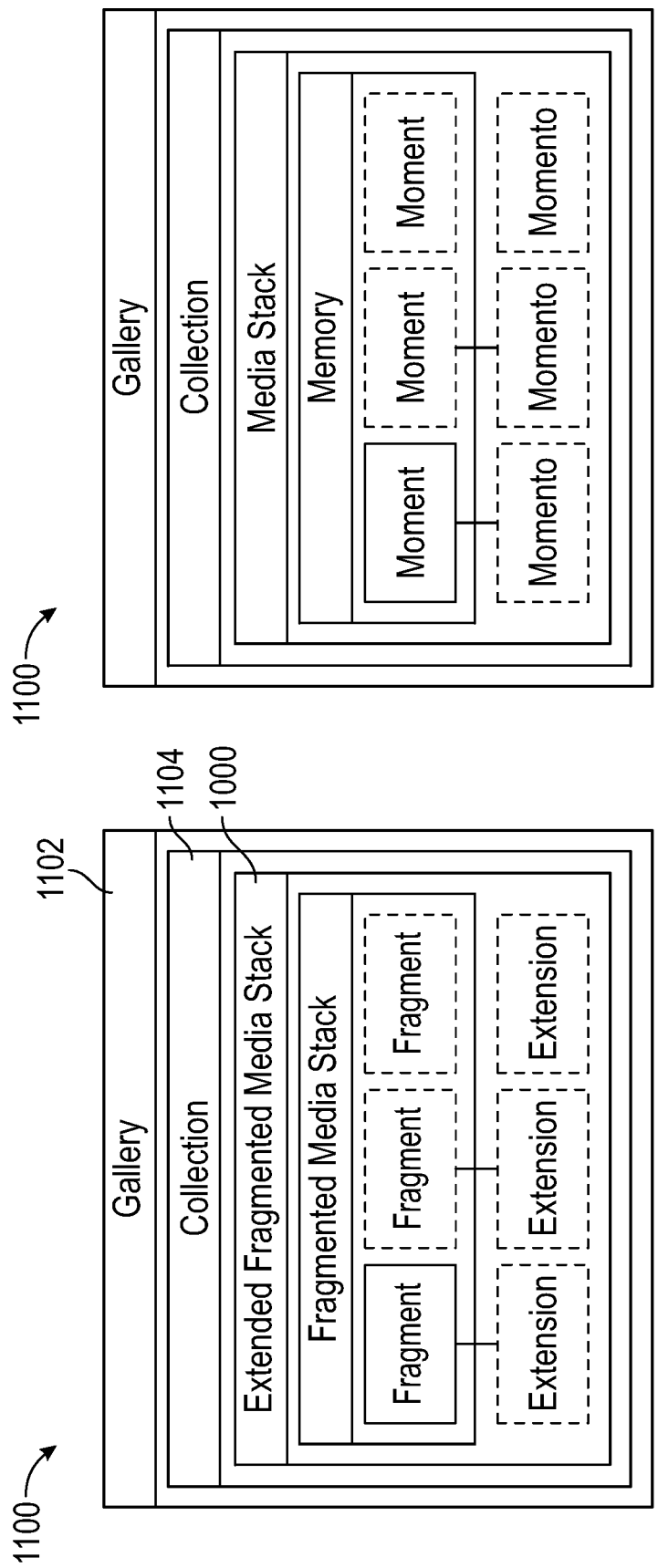
FIG. 11A illustrates an exemplary data structure according to certain embodiments.
FIG. 11B illustrates an alternative view of the exemplary data structure of FIG. 11A according to certain embodiments.

FIG. 10B is a diagram 1006 illustrating how a media stack 1000 with extension objects 1004 can be stored and related to other objects or data structures associated with collections and galleries FIGS. 11A and 11B illustrate a diagram 1100 illustrating how the media stack 1000 can be stored and related to other objects or data structures associated with collections and galleries. The diagram 1100 in FIG. 11A includes a gallery 1102, a collection 1104, and the media stack 1000. FIG. 11B illustrates the diagram 1100 with terminology to be utilized in the user interfaces. For example, a media stack contains a small handful of related photos from a specific time, place, event, activity, or trip, of a particular subject over time, or of a certain related theme, among other possibilities. Thus, the primary individual media contents of the media stack 1000 can be referred to each as a Moment, which together form a collective Memory as the media stack embodies. In some embodiments, these Memories or individual Moments may be extended with additional related content in the form of Mementos. Mementos are intended to allow the User to attach additional new media content which is not inherently a part of the original Memory. This terminology can be seen in the following user interfaces to allow for ease of use.

Figure 12A:
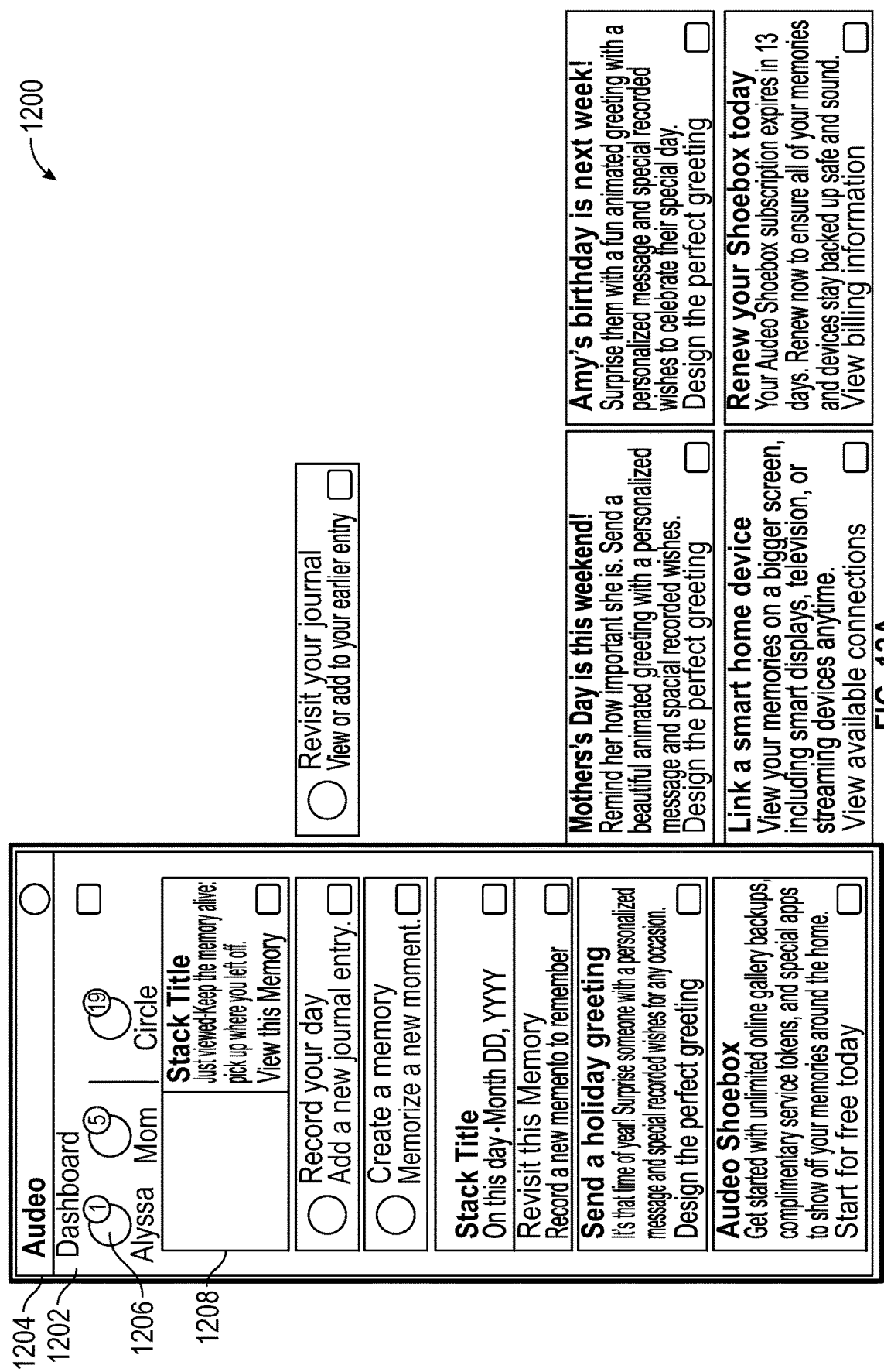
FIG. 12A illustrates an exemplary interface according to certain embodiments.
Figure 12B:
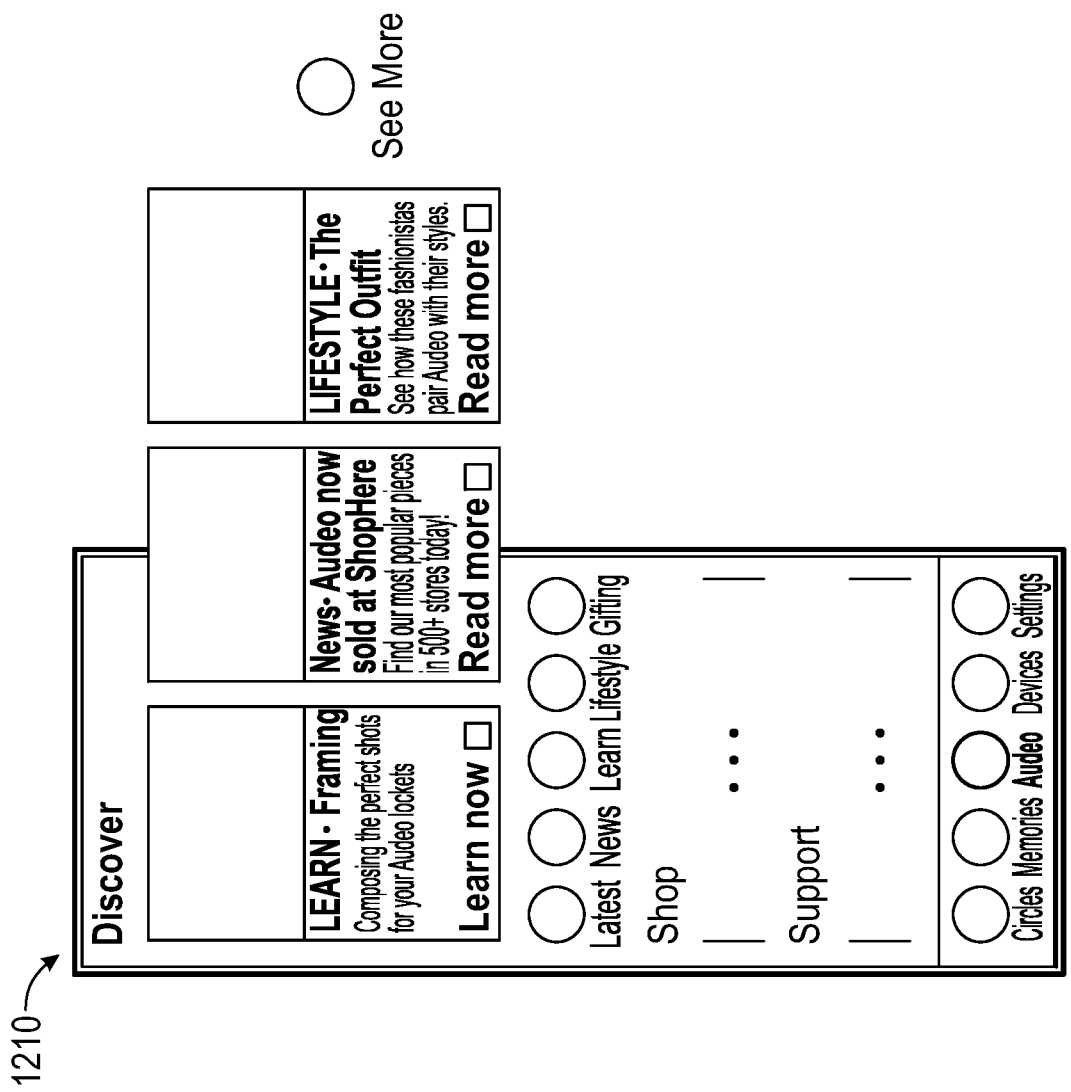
FIG. 12B illustrates an exemplary interface according to certain embodiments.
Figure 12D:
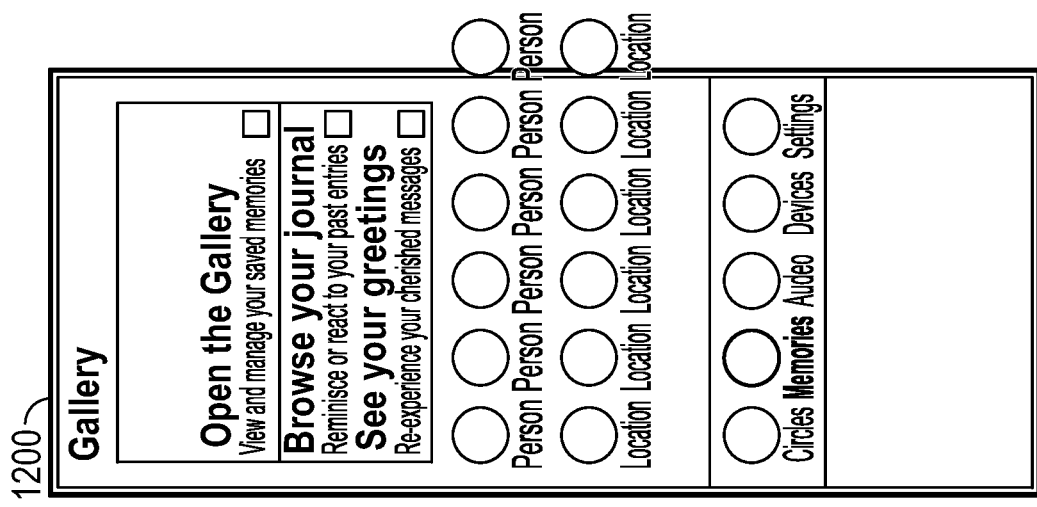
FIG. 12D illustrates an exemplary interface according to certain embodiments.
Figure 12C:
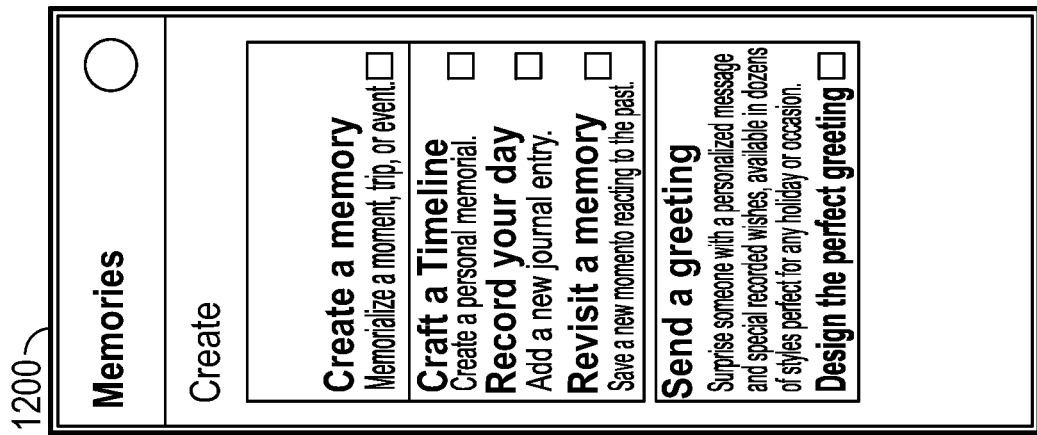
FIG. 12C illustrates an exemplary interface according to certain embodiments.
Figures 12E, 12F:
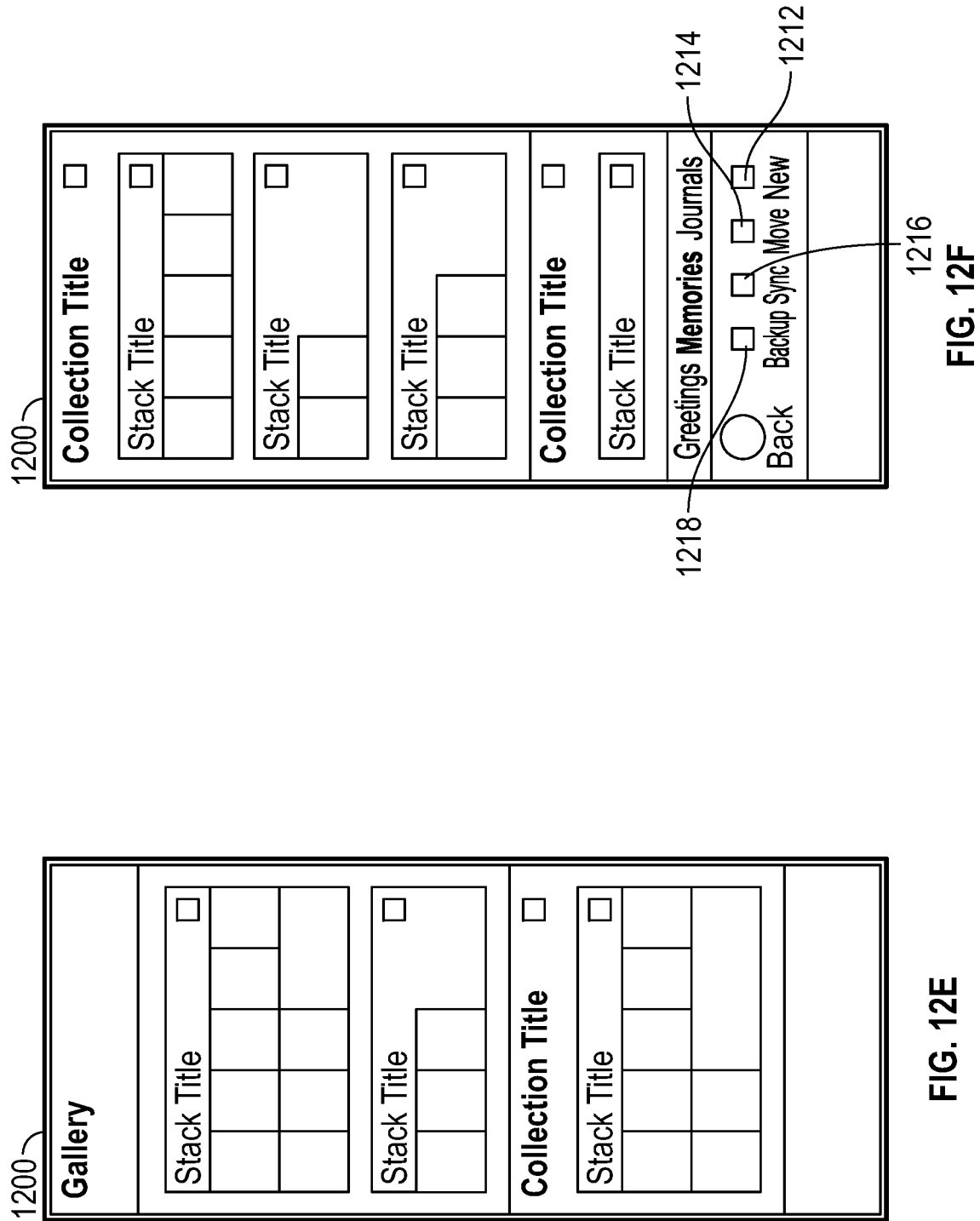
FIG. 12E illustrates an exemplary interface according to certain embodiments.
FIG. 12F illustrates an exemplary interface according to certain embodiments.
Figure 12H:
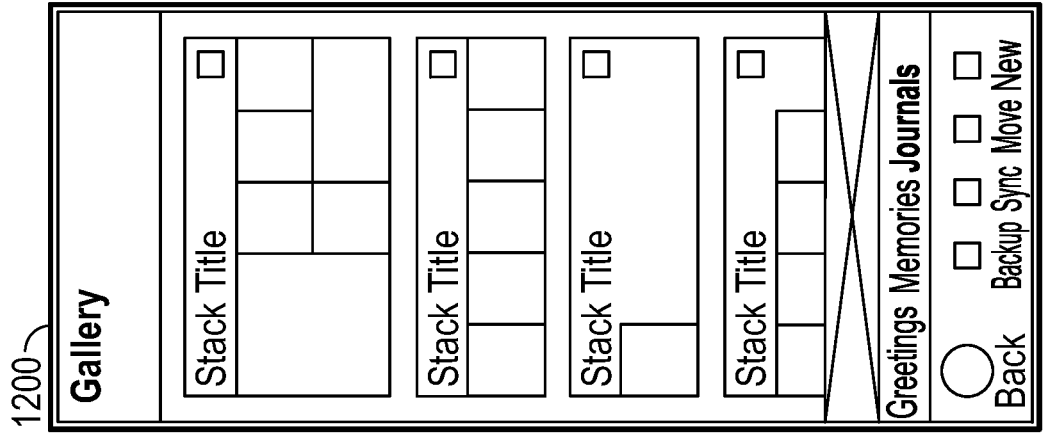
FIG. 12H illustrates an exemplary interface according to certain embodiments.
Figure 12G:
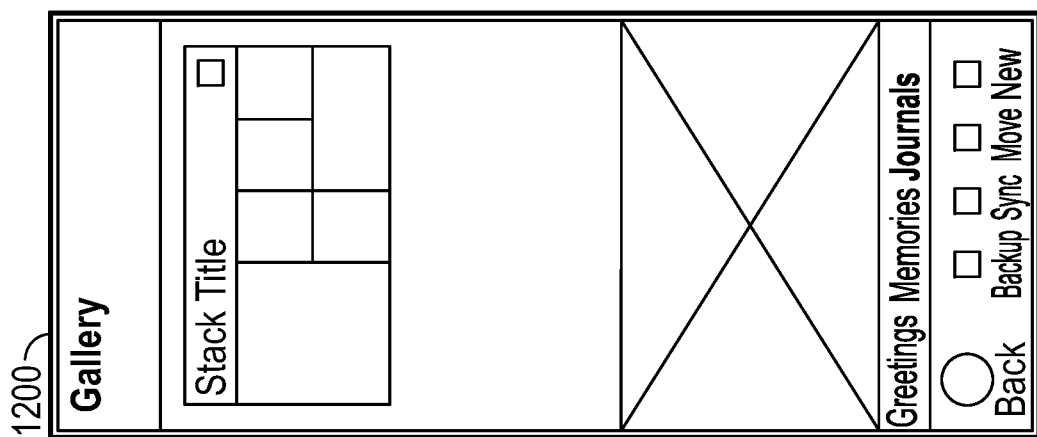
FIG. 12G illustrates an exemplary interface according to certain embodiments.
Figure 12K:
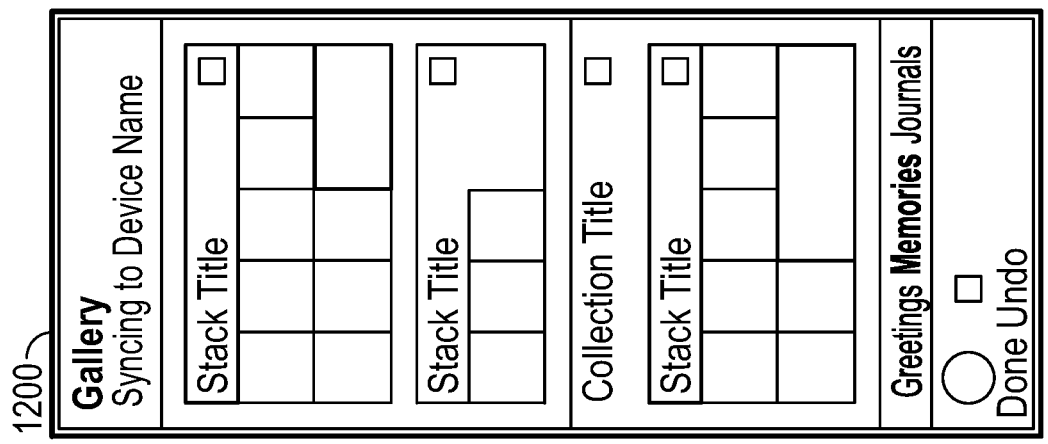
FIG. 12K illustrates an exemplary interface according to certain embodiments.
Figure 12J:
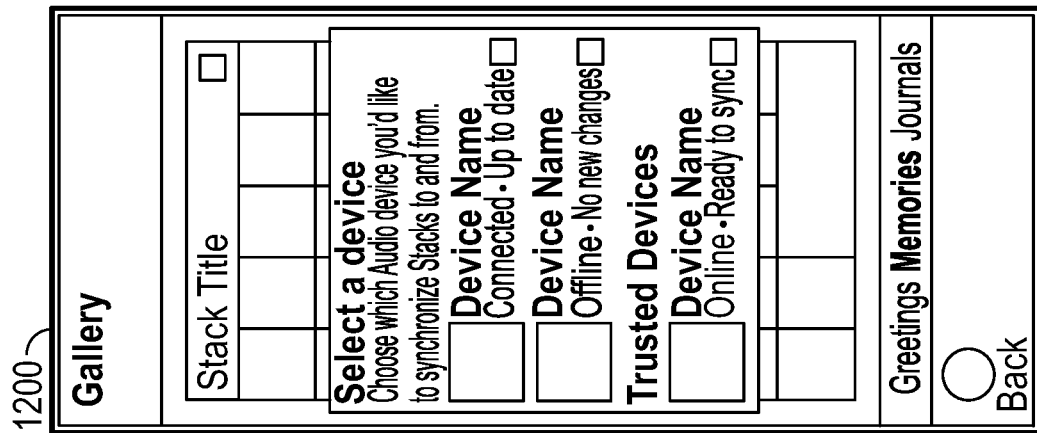
FIG. 12J illustrates an exemplary interface according to certain embodiments.
Figure 12I:
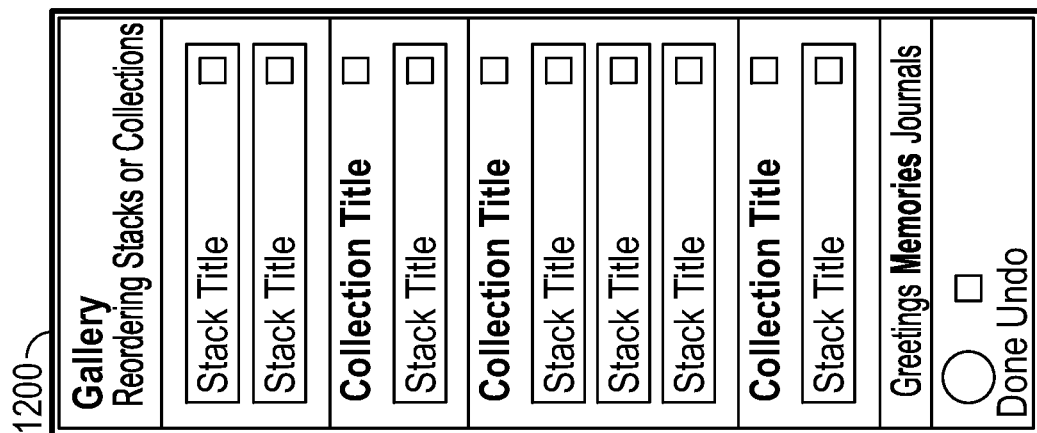
FIG. 12I illustrates an exemplary interface according to certain embodiments.
Figure 12L:
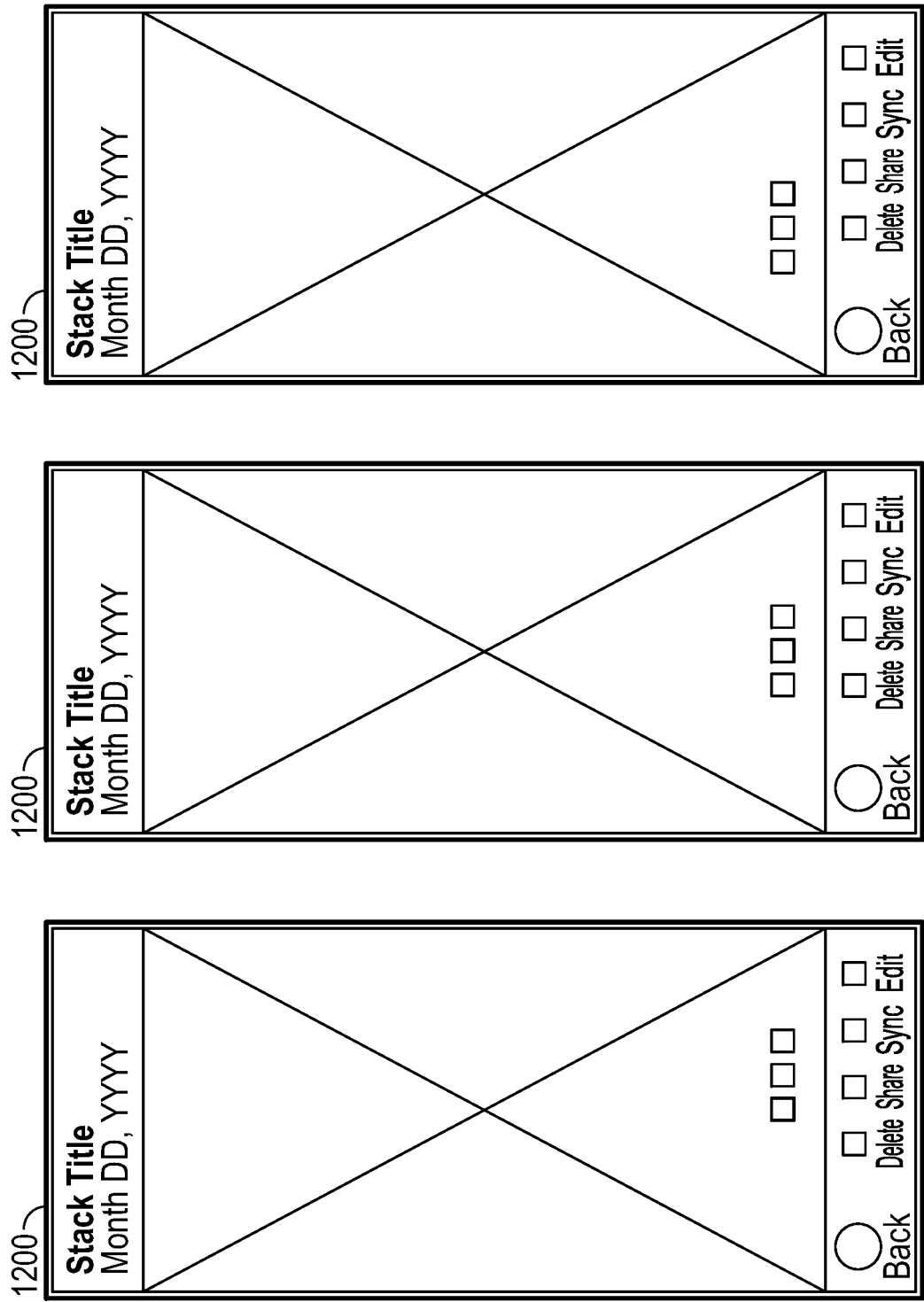
FIG. 12L illustrates an exemplary interface according to certain embodiments.
Figure 12M:
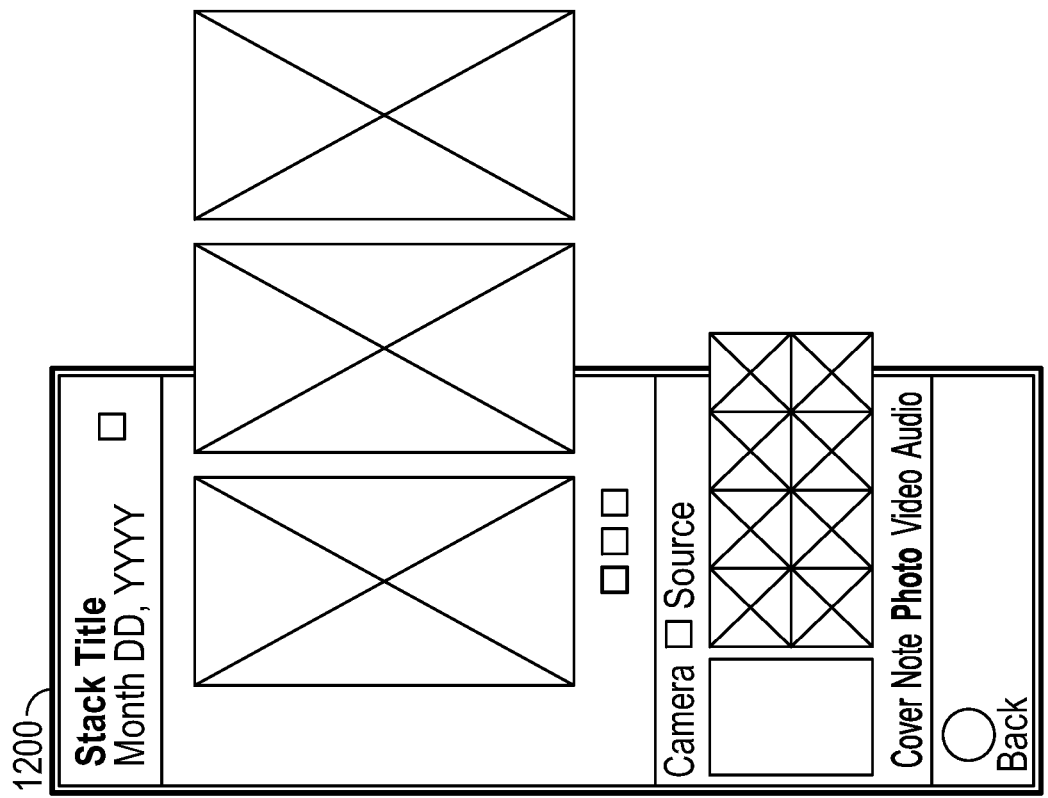
FIG. 12M illustrates an exemplary interface according to certain embodiments.
Figure 12N:
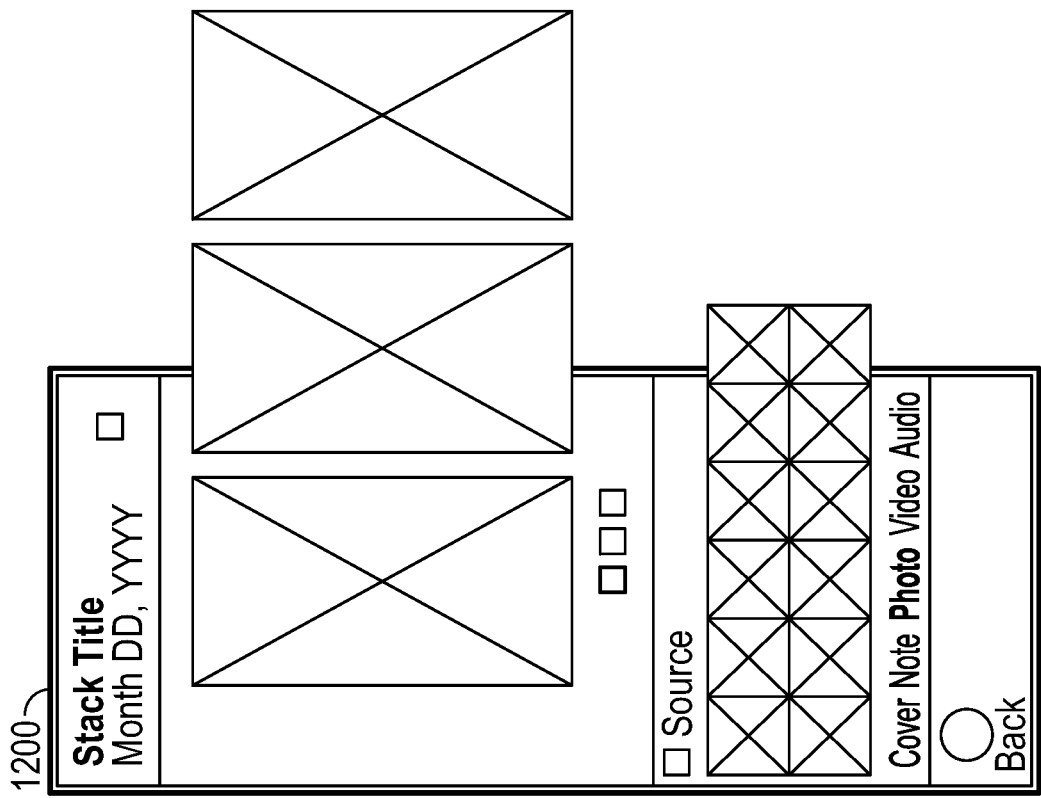
FIG. 12N illustrates an exemplary interface according to certain embodiments.
Figure 12O:
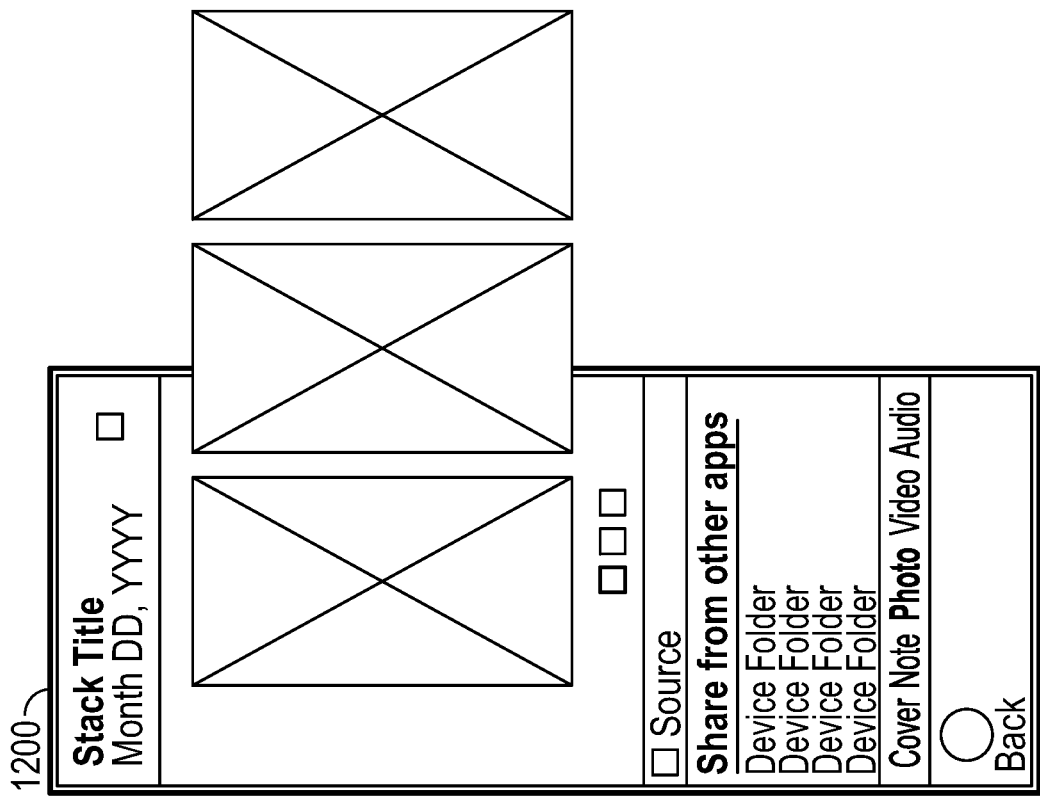
FIG. 12O illustrates an exemplary interface according to certain embodiments.

FIGS. 12A-12O illustrate additional interfaces 1200 according to certain embodiments. The interface 1200 in FIG. 12A illustrates an exemplary interface when a user opens an accessary control application 116. The interface 1200 illustrates a dashboard 1202 that includes a user icon 1204 to display a user's profile image, a friend icon 1206 that displays a user icon for a friend of the user. The user interface 1200 includes media stack sections 1208 that illustrate a media stack that is currently being played on a wearable electronic accessory 160, or can provide a preview of another media stack.

FIG. 12B is a continuation of the user interface 1200 and, in some scenarios, can be accessed via a scroll gesture. The user interface 1200 can include a discover section 1210 that provides the user with suggested content to view, products or services to purchase, or individuals and/or foundations to support.

FIGS. 12C and 12D illustrate a user interface 1200 that can be displayed in response to a user selecting the memory option. The illustrated user interface 1200 allows a user to create a memory, send a greeting, or open a gallery to view media.

FIGS. 12E and 12F illustrate the user interface 1200 that can be displayed in response to a user has selected an option to create a media stack. The user interface 1200 includes a new option 1212, a move option 1214, a sync option 1216, and a backup option 1218. The new option allows a user to create a new media stack or collection in a specified position. The move option 1214 allows a user to collapse media stacks to reorganize media stacks and collections. The sync option 1216 allows a user to choose a device (e.g., electronic device, wearable electronic accessory, peripheral device, etc.) to synchronize the media stack with and to display the media stack on the device. The backup option 1218 allows a user to check a status of online backup upload or create a local backup file to export to ensure the media stacks are properly saved in a database.

FIGS. 12G and 12H illustrate the user interface 1200 that can be displayed in response to a user selecting an option to create a journal entry. A journal entry can include written or typed content for a media stack. In some embodiments, the user interface 1200 of FIGS. 12G and 12H can be displayed in response to a user viewing existing journal entries in the user's gallery.

FIGS. 12I-12K illustrate the user interface 1200 that can be displayed in response to a user selecting an option to create a memory. In particular, the user interface 1200 of FIG. 12I can be displayed in response to a user selecting the move option 1214, and the user interface 1200 of FIGS. 12J and 12K can be displayed in response to the user selecting the sync option 1216.

FIG. 12L illustrates the user interface 1200 that can be displayed in response to a user selecting an option to view individual media items, which can be added to or removed from a media stack. For example, the user can select options to delete the media item, share the media item, sync the media item, or edit the media item.

FIGS. 12M-12O illustrate the user interface 1200 that can be displayed in response to a user selecting an option to edit a media stack.

It should be recognized that the accessory control applications 116 can generate additional interfaces 400, 500, 600, 1200 other than those explicitly shown, and that the interfaces 400, 500, 600, 1200 illustrated in the drawings can be modified in various ways (e.g., sections, representations, and input options can be presented in other layouts and can be supplemented with additional features).

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

In certain embodiments, a wearable electronic necklace accessory is disclosed. The wearable electronic necklace accessory can include: a support structure that permits the wearable electronic accessory to be worn in a user's neck region; an electronic pendant coupled to the support structure, the electronic pendant comprising a housing that includes a first wall, a second wall, and one or more side walls configured to couple the first wall to the second wall; a display device coupled to the first wall, the display device configured to display electronic media; an audio device positioned within the pendant housing and configured to output audio content; a communication device configured to communicate with one or more electronic devices; a storage device configured to store a device application; and a processor positioned within the pendant housing and coupled to the storage device and the communication device, wherein execution of the device application causes the processor to: pair, via the communication device, the wearable electronic necklace accessory with an electronic device via a synchronization procedure; receive, via the communication device, an electronic media stack from the electronic device, wherein the electronic media stack comprises a data structure that packages multiple types of electronic media for transmission to the wearable electronic necklace accessory and at least a portion of the electronic media is compressed to a format that is compatible with the display device; output the electronic media included with the electronic media stack.

In certain embodiments, a wearable electronic accessory is disclosed. The wearable electronic accessory can include: a pendant housing including a first wall, a second wall, and one or more side walls configured to couple the first wall to the second wall; a display device coupled to the first wall, the display device configured to display electronic media; an audio device positioned within the pendant housing and configured to output audio content; a communication device configured to communicate with one or more electronic devices; a storage device configured to store a device application; and a processor positioned within the pendant housing and coupled to the storage device and the communication device, wherein execution of the device application causes the processor to: pair, via the communication device, the wearable electronic accessory with an electronic device via a synchronization procedure; receive, via the communication device, an electronic media stack from the electronic device, wherein the electronic media stack comprises a data structure that packages multiple types of electronic media for transmission to the wearable electronic accessory and at least a portion of the electronic media is compressed to a format that is compatible with the display device; output, via the display device and the audio device, the electronic media included with the electronic media stack.

In some embodiments, the synchronization procedure between the wearable electronic accessory and the electronic device comprises: authenticating the wearable electronic accessory with a unique identifier; establishing a connection between the wearable electronic accessory and the electronic device; transmitting a status request from the electronic device to the wearable electronic accessory; and receiving a response signal from the wearable electronic accessory indicating the wearable electronic accessory is ready to receive the media stack; prior to transmitting the media stack from the electronic device to the wearable electronic accessory, compressing the portion of the electronic media to be compatible with an aspect ratio of the display device included on the wearable electronic accessory; and after transmitting the media stack from the electronic device to the wearable electronic accessory, sending a verification response from the wearable electronic accessory to the electronic device indicating whether or not the media stack was successfully transferred to the wearable electronic accessory.

In some embodiments, sending the verification response from the wearable electronic accessory to the electronic device includes transmitting the electronic media stack received by the wearable electronic accessory back to the electronic device; and the electronic media stack transmitted by the electronic device is compared with the electronic media stack transmitted by the wearable electronic accessory to detect if any of the electronic media was not successfully received by the wearable electronic accessory.

In some embodiments, the data structure of the electronic media stack includes a container for encapsulating a plurality of objects corresponding to electronic media, and the plurality of objects are selected from the group consisting of: a note object, an audio object, an image object, a video object, a fragment object, or an extension object, or other potential data types, file types, or object types.

In some embodiments, the display device includes a capacitive sensing medium that is configured to detect touches and gestures; the capacitive sensing medium is configured to detect one or more gestures; and the one or more gestures detected via the capacitive sensing medium enable one of more functionalities of the wearable electronic accessory to be controlled.

In some embodiments, the wearable electronic accessory includes a support structure coupled to the pendant housing, the support structure comprising at least one of: a necklace, a chain, or a cord; and an input device physically coupled to the pendant housing and electronically coupled to the processor, the input device enabling one of more functionalities of the wearable electronic accessory to be controlled.

In some embodiments, the wearable electronic accessory is configured to execute a communication protocol that enables the electronic media stack to be transmitted from the wearable electronic accessory directly to a second wearable electronic accessory.

In some embodiments, the communication protocol utilizes near field communications to transfer the media stack from the wearable electronic accessory to the second wearable electronic accessory.

In some embodiments, the wearable electronic accessory is configured to wirelessly pair and communicate with each of: electronic devices, wearable electronic devices, and peripheral devices.

In certain embodiments, a system is disclosed. The system can include: (a) a wearable electronic accessory including: a pendant housing including a first wall, a second wall, and one or more side walls configured to couple the first wall to the second wall; a display device coupled to the first wall, the display device configured to display electronic media; an audio device positioned within the pendant housing and configured to output audio content; and a processor positioned within the pendant housing, the processor configured to execute an accessory control application to: pair the wearable electronic accessory with an electronic device via a synchronization procedure; receive an electronic media stack from the electronic device, wherein the electronic media stack comprises a data structure that packages multiple types of electronic media for transmission to the wearable electronic accessory and at least a portion of the electronic media is compressed to a format that is compatible with the display device; and output, via the display device and the audio device, the electronic media included with the electronic media stack; (b) an accessory control application stored on, and executed by, the electronic device, wherein the accessory control application is configured to: authenticate the wearable electronic accessory with a unique identifier; establish a connection between the wearable electronic accessory and the electronic device; transmit a status request from the electronic device to the wearable electronic accessory; and receive a response signal from the wearable electronic accessory indicating the wearable electronic accessory is ready to receive the electronic media stack.

In some embodiments, the accessory control application stored on, and executed by, the electronic device is further configured to: prior to transmitting the electronic media stack from the electronic device to the wearable electronic accessory, compress the portion of the electronic media to be compatible with an aspect ratio of the display device included on the wearable electronic accessory; and after transmitting the electronic media stack from the electronic device to the wearable electronic accessory, send a verification response from the wearable electronic accessory to the electronic device indicating whether or not the electronic media stack was successfully transferred to the wearable electronic accessory.

In some embodiments, sending the verification response from the wearable electronic accessory to the electronic device includes transmitting the electronic media stack received by the wearable electronic accessory back to the electronic device; and the electronic media stack transmitted by the electronic device is compared with the electronic media stack transmitted by the wearable electronic accessory to detect if any of the electronic media was not successfully received by the wearable electronic accessory.

In some embodiments, the data structure of the electronic media stack includes a container for encapsulating a plurality of objects corresponding to electronic media, and the plurality of objects are selected from the group consisting of: a note object, an audio object, an image object, a video object, a fragment object, or an extension object.

In some embodiments, the display device includes a capacitive sensing medium that is configured to detect touches and gestures; the capacitive sensing medium is configured to detect one or more gestures; and the one or more gestures detected via the capacitive sensing medium enable one of more functionalities of the wearable electronic accessory to be controlled.

In some embodiments, the system further comprises: a support structure coupled to the pendant housing, the support structure comprising at least one of: a necklace, a chain, or a cord; and an input device physically coupled to the pendant housing and electronically coupled to the processor, the input device enabling one of more functionalities of the wearable electronic accessory to be controlled.

In some embodiments, the wearable electronic accessory is configured to execute a communication protocol that enables the electronic media stack to be transmitted from the wearable electronic accessory directly to a second wearable electronic accessory.

In some embodiments, the communication protocol utilizes near field communications to transfer the media stack from the wearable electronic accessory to the second wearable electronic accessory.

In some embodiments, the wearable electronic accessory is configured to wirelessly pair and communicate with each of: electronic devices, wearable electronic devices, and peripheral devices.

In some embodiments a system is disclosed. The system can include an electronic device configured to execute an accessory control application to: display a first user interface including one or more options to create a media stack based on one or more electronic media items and one or more electronic audio items; generating a media stack based on the one or more electronic media items and the one or more electronic audio items that were selected via the first user interface; displaying a second user interface including one or more options to transmit the media stack to one or more wearable electronic accessories, electronic devices, or peripheral devices; compressing the media stack based on configurations of the one or more wearable electronic accessories, electronic devices, or peripheral devices that were selected via the second user interface; and transmitting the compressed media stack to the one or more wearable electronic accessories, electronic devices, or peripheral devices that were selected via the second user interface.

In some embodiments, the system can include displaying a third user interface including one or more options to edit the media stack by adding or removing the one or more electronic media items and the one or more electronic audio items. In some embodiments, the system can include updating the media stack based on the one or more electronic media items and the one or more electronic audio items selected via the third user interface, and compressing the media stack based on a second configuration based on an aspect ratio of a peripheral device.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A wearable electronic necklace accessory comprising:
   a support structure that permits the wearable electronic necklace accessory to be worn in or around a user's neck region;
   an electronic pendant coupled to the support structure, the electronic pendant comprising a housing that includes a first wall, a second wall, and one or more side walls configured to couple the first wall to the second wall;
   a display device coupled to the first wall, the display device configured to display electronic media;
   an audio device positioned within the pendant housing and configured to output audio content;
   a communication device configured to communicate with one or more electronic devices;
   a storage device configured to store a device application; and
   a processor positioned within the pendant housing and coupled to the storage device and the communication device, wherein execution of the device application causes the processor to:
      pair, via the communication device, the wearable electronic necklace accessory with an electronic device via a synchronization procedure;
      receive, via the communication device, an electronic media stack from the electronic device, wherein the electronic media stack comprises a data structure that packages multiple types of electronic media for transmission to the wearable electronic necklace accessory and at least a portion of the electronic media is compressed to a format that is compatible with the display device; and
      output, via the display device and the audio device, the electronic media included with the electronic media stack;
   wherein the synchronization procedure between the wearable electronic necklace accessory and the electronic device comprises:
      authenticating the wearable electronic necklace accessory with a unique identifier;
      establishing a connection between the wearable electronic necklace accessory and the electronic device;
      transmitting a status request from the electronic device to the wearable electronic necklace accessory;
      receiving a response signal from the wearable electronic necklace accessory indicating the wearable electronic accessory is ready to receive the media stack;
      prior to transmitting the media stack from the electronic device to the wearable electronic necklace accessory, compressing the portion of the electronic media to be compatible with an aspect ratio of the display device included on the wearable electronic necklace accessory; and
      after transmitting the media stack from the electronic device to the wearable electronic necklace accessory, sending a verification response from the wearable electronic necklace accessory to the electronic device indicating whether or not the media stack was successfully transferred to the wearable electronic necklace accessory.

2. A wearable electronic accessory comprising:
   a pendant housing including a first wall, a second wall, and one or more side walls configured to couple the first wall to the second wall;
   a display device coupled to the first wall, the display device configured to display electronic media;
   an audio device positioned within the pendant housing and configured to output audio content;
   a communication device configured to communicate with one or more electronic devices;
   a storage device configured to store a device application; and a processor positioned within the pendant housing and coupled to the storage device and the communication device, wherein execution of the device application causes the processor to:
pair, via the communication device, the wearable electronic accessory with an electronic device via a synchronization procedure;
receive, via the communication device, an electronic media stack from the electronic device, wherein the electronic media stack comprises a data structure that packages multiple types of electronic media for transmission to the wearable electronic accessory and at least a portion of the electronic media is compressed to a format that is compatible with the display device;
output the electronic media included with the electronic media stack;
wherein the synchronization procedure between the wearable electronic accessory and the electronic device comprises:
authenticating the wearable electronic accessory with a unique identifier;
establishing a connection between the wearable electronic accessory and the electronic device;
transmitting a status request from the electronic device to the wearable electronic accessory;
receiving a response signal from the wearable electronic accessory indicating the wearable electronic accessory is ready to receive the media stack;
prior to transmitting the media stack from the electronic device to the wearable electronic accessory, compressing the portion of the electronic media to be compatible with an aspect ratio of the display device included on the wearable electronic accessory; and
after transmitting the media stack from the electronic device to the wearable electronic accessory, sending a verification response from the wearable electronic accessory to the electronic device indicating whether or not the media stack was successfully transferred to the wearable electronic accessory.

3. The wearable electronic accessory of claim 2, wherein:
sending the verification response from the wearable electronic accessory to the electronic device includes transmitting the electronic media stack received by the wearable electronic accessory back to the electronic device; and
the electronic media stack transmitted by the electronic device is compared with the electronic media stack transmitted by the wearable electronic accessory to detect if any portion of the electronic media was not successfully received by the wearable electronic accessory.

4. The wearable electronic accessory of claim 2, wherein the data structure of the electronic media stack includes a container for encapsulating a plurality of objects corresponding to electronic media, and the plurality of objects are selected from the group consisting of: a note object, an audio object, an image object, a video object, a fragment object, or an extension object.

5. The wearable electronic accessory of claim 2, wherein:
the display device includes a capacitive sensing medium;
the capacitive sensing medium is configured to detect one or more gestures; and
the one or more gestures detected via the capacitive sensing medium enable one of more functionalities of the wearable electronic accessory to be controlled.

6. The wearable electronic accessory of claim 2, further comprising:
a support structure coupled to the pendant housing, the support structure comprising at least one of: a necklace, a chain, or a cord; and
an input device physically coupled to the pendant housing and electronically coupled to the processor, the input device enabling one of more functionalities of the wearable electronic accessory to be controlled.

7. The wearable electronic accessory of claim 2, wherein the wearable electronic accessory is configured to execute a communication protocol that enables the electronic media stack to be transmitted from the wearable electronic accessory directly to a second wearable electronic accessory.

8. The wearable electronic accessory of claim 7, wherein the communication protocol utilizes near field communications to transfer the electronic media stack from the wearable electronic accessory to the second wearable electronic accessory.

9. The wearable electronic accessory of claim 8, wherein the wearable electronic accessory is configured to wirelessly pair and communicate with each of:
electronic devices, wearable electronic devices, and peripheral devices.

10. A system comprising:
(a) a wearable electronic accessory comprising:
a pendant housing including a first wall, a second wall, and one or more side walls configured to couple the first wall to the second wall;
a display device coupled to the first wall, the display device configured to display electronic media;
an audio device positioned within the pendant housing and configured to output audio content;
a communication device configured to communicate with one or more electronic devices;
a storage device configured to store a device application; and
a processor positioned within the pendant housing and coupled to the storage device and the communication device, wherein execution of the device application causes the processor to:
pair the wearable electronic accessory with an electronic device via a synchronization procedure;
receive an electronic media stack from the electronic device, wherein the electronic media stack comprises a data structure that packages multiple types of electronic media for transmission to the wearable electronic accessory and at least a portion of the electronic media is compressed to a format that is compatible with the display device; and
output, via the display device and the audio device, the electronic media included with the electronic media stack;
(b) an accessory control application stored on, and executed by, the electronic device, wherein the accessory control application is configured to:
authenticate the wearable electronic accessory with a unique identifier;
establish a connection between the wearable electronic accessory and the electronic device;
transmit a status request from the electronic device to the wearable electronic accessory;
receive a response signal from the wearable electronic accessory indicating the wearable electronic accessory is ready to receive the electronic media stack;
prior to transmitting the electronic media stack from the electronic device to the wearable electronic accessory, compress the portion of the electronic media to be compatible with an aspect ratio of the display device included on the wearable electronic accessory; and after transmitting the electronic media stack from the electronic device to the wearable electronic accessory, receive a verification response from the wearable electronic accessory indicating whether or not the electronic media stack was successfully transferred to the wearable electronic accessory.

11. The system of claim 10, wherein:

sending the verification response from the wearable electronic accessory to the electronic device includes transmitting the electronic media stack received by the wearable electronic accessory back to the electronic device; and the electronic media stack transmitted by the electronic device is compared with the electronic media stack transmitted by the wearable electronic accessory to detect if any portion of the electronic media was not successfully received by the wearable electronic accessory.

12. The system of claim 10, wherein the data structure of the electronic media stack includes a container for encapsulating a plurality of objects corresponding to electronic media, and the plurality of objects are selected from the group consisting of: a note object, an audio object, an image object, a video object, a fragment object, or an extension object.

13. The system of claim 10, wherein:

the display device includes a capacitive sensing medium;

the capacitive sensing medium is configured to detect one or more gestures; and the one or more gestures detected via the capacitive sensing medium enable one of more functionalities of the wearable electronic accessory to be controlled.

14. The system of claim 10, further comprising:

a support structure coupled to the pendant housing, the support structure comprising at least one of: a necklace, a chain, or a cord; and an input device physically coupled to the pendant housing and electronically coupled to the processor, the input device enabling one of more functionalities of the wearable electronic accessory to be controlled.

15. The system of claim 10, wherein the wearable electronic accessory is configured to execute a communication protocol that enables the electronic media stack to be transmitted from the wearable electronic accessory directly to a second wearable electronic accessory.

16. The system of claim 15, wherein the communication protocol utilizes near field communications to transfer the electronic media stack from the wearable electronic accessory to the second wearable electronic accessory.

17. The system of claim 16, wherein the wearable electronic accessory is configured to wirelessly pair and communicate with each of: electronic devices, wearable electronic devices, and peripheral devices.

* * * * *